(12) United States Patent
Takagi et al.

(10) Patent No.: US 7,891,068 B2
(45) Date of Patent: Feb. 22, 2011

(54) RECOVERY METHOD OF ELECTRIC APPLIANCE

(75) Inventors: Tsukasa Takagi, Tokyo (JP); Yoshihiro Tanabe, Tokyo (JP); Hideaki Nagatomo, Tokyo (JP); Kazuhiro Ishida, Tokyo (JP); Kouichi Nakagawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 395 days.

(21) Appl. No.: 11/944,877

(22) Filed: Nov. 26, 2007

(65) Prior Publication Data

US 2008/0066282 A1    Mar. 20, 2008

Related U.S. Application Data

(63) Continuation of application No. 10/501,916, filed as application No. PCT/JP02/05427 on Jun. 3, 2002, now Pat. No. 7,318,265.

(51) Int. Cl.
    *B07B 13/00* (2006.01)
(52) U.S. Cl. .................... 29/403.1; 29/403.2; 29/403.3; 29/407.05; 29/426.1; 29/426.5
(58) Field of Classification Search ................ 29/403.1, 29/403.2, 403.3, 426.1, 426.2, 426.3, 426.4, 29/426.5, 407.01, 407.05; 241/24.1, 24.12, 241/24.13, 24.18, 24.25, 24.28
See application file for complete search history.

(56) References Cited

U.S. PATENT DOCUMENTS 5,965,858 A    10/1999    Suzuki et al.

FOREIGN PATENT DOCUMENTS

DE    199 44 688 A1    4/2000

(Continued)

OTHER PUBLICATIONS

"Environmental labels and declarations-self-declared environmental claims (type II environmental labelling)", ISO 14021, first edition Sep. 15, 1999.
Japanese Office Action issued on Sep. 7, 2010, Patent Application No. 2007-266592 (with English translation).

*Primary Examiner*—Jermie E Cozart
(74) *Attorney, Agent, or Firm*—Oblon, Spivak, McClelland, Maier & Neustadt, L.L.P.

(57) ABSTRACT

A mark is displayed to a manually scrapped component capable of being disassembled manually without disassembling or crushing by machine at the time of discard or recovery of an electric appliance after use, and the manually scrapped component is manually scrapped from a product, and in the case of crushing by machine thereafter, the mark display is a mark capable of separation into plural kinds of substance on which a cost burden is imposed and valuable substance after recovery, and scrapping can be performed easily at low cost.

5 Claims, 22 Drawing Sheets

FOREIGN PATENT DOCUMENTS

| | | |
|---|---|---|
| JP | 6-165893 | 6/1994 |
| JP | 9-155327 | 6/1997 |
| JP | 9-226737 | 9/1997 |
| JP | 10-277529 | 10/1998 |
| JP | 10-328644 | 12/1998 |
| JP | 11-212471 | 8/1999 |
| JP | 2000-037685 | 2/2000 |
| JP | 2000-189936 | 7/2000 |
| JP | 2000-233408 | 8/2000 |
| JP | 2000-267609 | 9/2000 |
| JP | 2002-059149 | 2/2002 |
| JP | 2002-132908 | 5/2002 |
| JP | 2002-143826 | 5/2002 |

>PS-HI< —101

>PP< —101

FIG. 3(a)
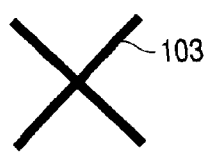
FIG. 3(b)
FIG. 3(c)
FIG. 3(d)
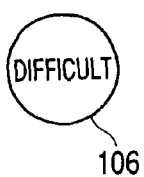
FIG. 3(e)
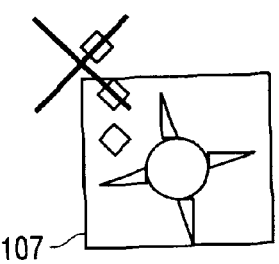
FIG. 3(f)
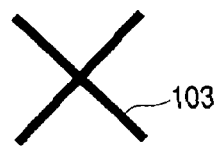
FIG. 3(g)
Harmful ~108
FIG. 3(h)
FIG. 3(i)
FIG. 3(j)
FIG. 3(k)
R A R E
 ＼
  111
FIG. 3(l)
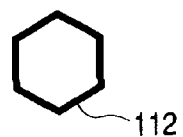
FIG. 3(m)
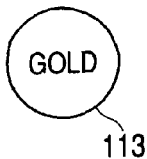

|  | MATERIAL COST | WORK COST | REVENUE | PRODUCT COST |
|---|---|---|---|---|
| REVENUE | VALUABLE AMOUNT | - | USER BURDEN AMOUNT | - |
| EXPENDITURE | INVERSE ONEROUS AMOUNT | SCRAPPING TIME | - | MEASURE COST |

16: OUTDOOR ELECTRIC PRODUCT BOX
17: OUTDOOR CONTROL BOARD

FIG. 14

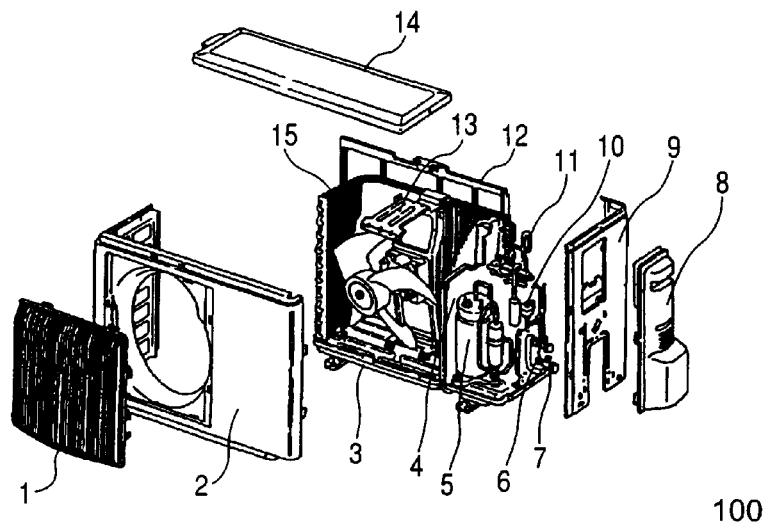

| REFERENCE NUMBER TO EXPLODED VIEW | COMPONENT NAME | MATERIAL | RECYCLING CODE | DIFFICULT-TO-CRUSH SUBSTANCE CODE |
|---|---|---|---|---|
| 1 | FAN COVER | POLYPROPYLENE | ♻ | |
| 2 | FRONT COVER | IRON | ♻ | |
| 3 | BASE | IRON | ♻ | |
| 4 | SEPARATOR | IRON | ♻ | |
| 5 | COMPRESSOR | IRON + COPPER + MAGNETIC SUBSTANCE | ♻ | × |
| 6 | STOP VALVE | COPPER ALLOY | ♻ | |
| 7 | STOP VALVE | COPPER ALLOY | ♻ | |
| 8 | SERVICE PANEL | POLYPROPYLENE | ♻ | |
| 9 | BACK PANEL | IRON | ♻ | |
| 10 | PIPE ASSEMBLY | COPPER | ♻ | |
| 11 | FOUR-WAY VALVE | COPPER ALLOY+IRON | ♻ | |
| 12 | CONDENSER NET | POLYPROPYLENE | ♻ | |
| 13 | MOTOR SUPPORT | IRON | ♻ | |
| 14 | TOP PANEL | IRON | ♻ | |
| 15 | HEAT EXCHANGER | ALUMINUM + COPPER | ♻ | |

| REFERENCE NUMBER TO EXPLODED VIEW | COMPONENT NAME | MATERIAL | RECYCLING CODE | DIFFICULT-TO-CRUSH SUBSTANCE CODE |
|---|---|---|---|---|
| 21 | BOX | POLYSTYRENE | ♻ | |
| 22 | FRONT PANEL | POLYSTYRENE | ♻ | |
| 23 | DECORATION COVER | POLYPROPYLENE | ♻ | |
| 24 | SCRAW CAP | POLYSTYRENE | ♻ | |
| 25 | MOUNTING PLATE | IRON | ♻ | |
| 26 | CORNER BOX | POLYSTYRENE | ♻ | |
| 27 | AIR FILTER | POLYPROPYLENE | | |

FIG. 17

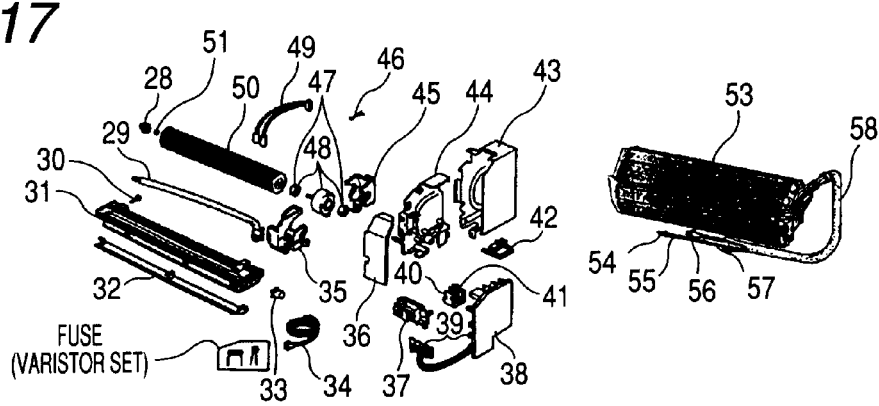

| REFERENCE NUMBER TO EXPLODED VIEW | COMPONENT NAME | MATERIAL | RECYCLING CODE | DIFFICULT-TO-CRUSH SUBSTANCE CODE |
|---|---|---|---|---|
| 28 | BEARING MOUNT | CHLOROPRENE RUBBER | | |
| 29 | DRAIN HOSE | VINYL CHLORIDE | | |
| 30 | DRAIN CAP | CHLOROPRENE RUBBER | | |
| 31 | NOZZLE | ACRYLONITRILE, BUTADIENE, STYRENE + FOAM PS | | × |
| 32 | VANE | POLYSTYRENE | ♻ | |
| 33 | VANE MOTOR | IRON + POLYACETAL | ♻ | |
| 34 | POWER SOURCE CORD | COPPER + VINYL CHLORIDE | ♻ | |
| 35 | MOTOR BAND | ACRYLONITRILE, BUTADIENE, STYRENE | ♻ | |
| 36 | ELECTRIC PRODUCT COVER | IRON | ♻ | |
| 37 | LIGHT RECEIVING BOARD HOLDER | POLYPROPYLENE | ♻ | |
| 38 | BOARD COVER | FLAME-RESISTANT ACRYLONITRILE, BUTADIENE, STYRENE (FLAME-RESISTANT ABS) | ♻ | |
| 39 | INDOOR CONTROL BOARD | PAPER PHENOL | | |
| 40 | TERMINAL PLATE | UNSATURATED POLYESTER (MICROCOMPUTER PORTION INCLUDES GOLD) | | |
| 41 | TEMPERATURE FUSE | | | |
| 42 | TERMINAL PLATE COVER | POLYCARBONATE | ♻ | |
| 43 | ELECTRIC PRODUCT BOX | IRON | ♻ | |
| 44 | BOARD BOX | FLAME-RESISTANT ACRYLONITRILE, BUTADIENE, STYRENE (FLAME-RESISTANT ABS) | ♻ | |
| 45 | MOTOR COVER | ACRYLONITRILE, BUTADIENE, STYRENE | ♻ | |
| 46 | ROOM TEMPERATURE THERMISTOR | | | |
| 47 | RUBBER MOUNT | CHLOROPRENE RUBBER | | |
| 48 | FAN MOTOR | IRON + COPPER + MAGNETIC SUBSTANCE + UNSATURATED POLYESTER | ♻ | × |
| 49 | PIPE TEMPERATURE THERMISTOR | | | |
| 50 | LINE FLOW FAN | STYRENE, ACRYLONITRILE + GLASS | | |
| 51 | BEARING | | | |
| 52 | INDOOR ELECTRIC WIRING DIAGRAM | PAPER | | |
| 53 | HEAT EXCHANGER | COPPER + ALUMINUM | ♻ | |
| 54 | UNION | COPPER ALLOY | ♻ | |
| 55 | COPPER PIPE | COPPER | ♻ | |
| 56 | UNION | COPPER ALLOY | ♻ | |
| 57 | COPPER PIPE | COPPER | ♻ | |
| 58 | PIPE COVER | | | |

FIG. 20
REMOVAL METHOD OF DOOR POCKET
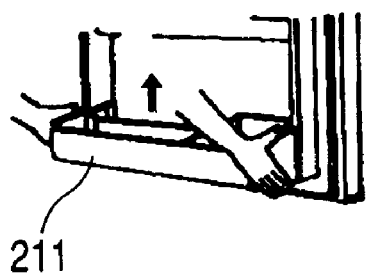
REMOVAL METHOD OF INSIDE PLASTIC SHELF
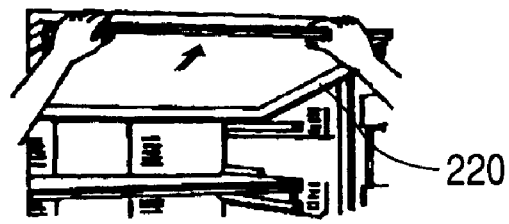
REMOVAL METHOD OF FOOD STOCK CASE
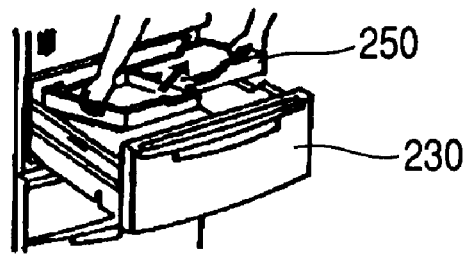

Background Art

RECOVERY METHOD OF ELECTRIC APPLIANCE

CROSS-REFERENCE TO RELATED APPLICATIONS

The present continuation application claims the benefit of priority under 35 U.S.C. §120 to application Ser. No. 10/501,916, filed Jul. 27, 2004, now U.S. Pat. No. 7,318,265 B2 which is the National Stage of PCT/JP02/05427, filed on Jun. 3, 2002, the entire contents of both are hereby incorporated herein by reference.

TECHNICAL FIELD

This invention relates to discard of electric appliances such as used home electric appliances.

BACKGROUND ART

As represented by Home Electric Appliance Recycling Law enforced on April, 2001 in Japan, by a growing interest in worldwide environment, more improvement in recycling efficiency of waste matter discharged in large amounts, achievement of a recycling rate which is the point of disposal criteria, and practice and acceleration of recycling of products and members with a minimum of cost have become a large problem in disposal of home electric appliances at present. As a result of that, large improvement cannot be expected by only efficiency of recycling practice of home electric appliances and there is an increasing need to incorporate efficiency improvement items of recycling disposal looking ahead to the future discard time into a design stage.

Flowcharts of a conventional recycling method are shown in FIGS. 23(a) and 23(b). FIG. 23(a) is a flowchart of the general case, and when a home electric appliance S100 was discarded S101 after the home electric appliance was used, landfill S102 was performed. In the case of previous discard of the home electric appliance, landfill disposal was generally performed. FIG. 23(b) is a flowchart of the case of passing disposal facilities, and when a home electric appliance S200 was discarded S201, waste products are first collected S202 by public institutions, professional agencies for handling waste products, distributors of home electric appliances, manufacturers and so on. The collected waste products are carried S203 into a recycling center. In the recycling center, with improvement in recycling efficiency, disposal by a disposal agency is being performed, but under the present circumstances, crushing S204 of the products by a crushing machine and further sorting S205 of materials by a sorting machine were performed and valuable substances S206 such as iron, copper or aluminum were recovered but in plastics, a small part of only the plastics easy to recycle was recycled S207 and the remainder were landfilled S208 together with dust.

With respect to such plastics, a proposal for forming a character etc. showing a construction material of a component on a surface of a plastic component so as to perform recycling simply has been made in JP-A-2000-233408 etc. which is a Published Unexamined Japanese Patent Application. Further, a proposal for representing indication that it is unnecessary to disassemble a synthetic resin assembly made of the same material on the assembly by a symbol or a particular character has been shown in JP-A-2000-267609 which is a Published Unexamined Japanese Patent Application. Further, the plastics have been defined as recyclable marks by ISO14021.

In the recycling center etc, performing partial separation (done by manual work, and hereinafter called manual scrapping work) which is a process before being put into a crushing machine (mechanical separation) has been advanced in recent years. Thus, in the manual scrapping work for performing partial separation, for example, a portion for including a large number of environmental impact substances and requiring special disposal, a relatively valuable portion, etc. are considered, but the manual scrapping work is done by decision of individual manufacturers or individual recycling agencies and there is no definite criterion and the case of a large cost burden is potentially passed up, with the result that a large problem arose as environmental measures. In the case that Home Electric Appliance Recycling Law is enforced in Japan, there was a problem that recovery cannot be made well even though the Law is enforced because only recoverable substances are recovered or relatively valuable substances (for example, gold) cannot be extracted and further substances having a bad influence on a crushing machine are also put into the crushing machine and thereby the bad influence is had on the crushing machine and so on. Also, there was a problem that scheduled recycling cannot be performed due to deformation or stain caused by handling at the time of recovery or during long-term use even for a product in consideration of recycling at a point in time of design. In the case of Japan, in addition to efficiency of recycling practice of home electric appliances discharged from 2001 based on the Law of Japan, there is no criterion as to how a future recycling rate aim could be brought to the present design products which will be discarded after ten years and ultimately, there is no criterion for aiming at the environmental load minimum as the whole life cycle of the product and there was a problem that cost of environmental measures becomes very high to result in the cause of the trouble in the future. In addition, since components including environmental impact substances, components generating value and components having an influence on the crushing machine are indefinite, disposal time to perform manual scrapping is long and further scrapping of the components having a bad influence on the crushing machine are missed and failure of the crushing machine is caused, so that a situation in which disposal cost necessary to perform recycling disposal increases has continued. As a result of this, there was a problem that a large burden of the environmental measures is put on all of the manufacturers, distributors, public institutions, etc. as well as recycling agencies and formation of recycling-oriented society is delayed and an influence is also had on positive challenges such as aiming at high efficiency and so on.

DISCLOSURE OF THE INVENTION

An object of the invention is to improve recovery work efficiency by making kinds of separation clear at the time of manual scrapping work which is a process before being put into a crushing machine and also prevent failure of the crushing machine and decrease cost of recycling disposal. Also, an object of the invention is to implement design for facilitating recycling or implement recycling business at low cost. An object of the invention is to implement product design with a high recycling rate at low cost. An object of the invention is to implement a recyclable product free from design time and discard time or free from places such as a design place and a scrapping place. Also, an object of the invention is to introduce a cost investment effect into recycling business such as scrapping or design in consideration of recycling of a product and accelerate formation of recycling-oriented society and substantially cheapen cost of environmental measures and return environmental protection and its benefit to general consumers as well as public institutions.

In order to achieve the objects, a recovery method of an electric appliance of the invention comprises the steps of displaying a mark or a symbol to a manually scrapped component capable of being disassembled by a tool or manually without disassembling or crushing by machine at the time of discard or recovery after use, scrapping the manually scrapped component from a product by a tool or manually before disassembling or crushing by machine at the time of discard or recovery after use, and crushing the residual product by machine after scrapping the manually scrapped component, and display of the mark or the symbol is a mark or a symbol capable of separation into plural kinds of substance on which a cost burden is imposed and valuable substance after recovery.

Also, in a mark or a symbol capable of separation into plural kinds, a mark or a symbol is attached to at least any of a trouble component damaging a crushing machine, a trouble component including a substance causing an obstacle to a run of a machine and a trouble component including a substance having a bad influence on environment, and also another mark or symbol is attached to any of a component including a substance having recovery value and a valuable recycled component.

Also, scrapping of a manually scrapped component to which a mark or a symbol is displayed is scrapping of a component to specified scrapping order or a component within specified time.

Also, a position of a manually scrapped component or specified scrapping order or scrapping time in the case of scrapping the manually scrapped component to which a mark or a symbol is displayed are preset and also setting of this set position or order or time can be changed by communication means or input means.

Also, a recovery method of an electric appliance comprises the steps of presetting and displaying plural kinds of manually scrapped components capable of being disassembled by a tool or manually without disassembling or crushing by machine at the time of discard or recovery after use, scrapping the manually scrapped components from a product by a tool or manually before disassembling or crushing by machine at the time of discard or recovery after use, and performing crushing by machine after scrapping the manually scrapped components, and the display is performed on a display device provided in an electric appliance by reading from storage means or receiving information from the outside through communication means.

Also, a recovery method of an electric appliance comprises the steps of displaying a manually scrapped component capable of being disassembled by a tool or manually without disassembling or crushing by machine at the time of discard or recovery after use on a preset display device, scrapping the manually scrapped component from a product by a tool or manually before disassembling or crushing by machine at the time of discard or recovery after use, and performing crushing by machine after scrapping the manually scrapped component, and setting of display of the display device can be changed by communication means or input means.

Also, a recovery method of an electric appliance comprises the steps of setting time for scrapping a manually scrapped component capable of being disassembled by a tool or manually without disassembling or crushing by machine at the time of discard or recovery after use, providing notification of arrival at scrapping time preset before scrapping during scrapping of the manually scrapped component, and performing crushing by machine after scrapping the manually scrapped component, and setting of the scrapping time set can be changed by communication means or input means.

Also, in an electric appliance, in the case of recovering a product after use, according to disposal of recovery, plural kinds of marks are attached to a component removed previously by a tool or manually before crushing by machine or are stored by different symbols in storage means provided in the product and the component can be distinguished from other components.

Also, in a previously removed component of an electric appliance, accumulated transition of value of the removed component is obtained with respect to a lapse of time taken for removal and is compared with time work cost of a previous removal process and thereby an object component is determined.

Also, a previously removed component of an electric appliance includes a trouble component which may cause trouble in the case of being put into a crushing machine, or a trouble component made of raw material having an influence on environment, or a valuable component with value of presence of rare metal etc., or a plastic component and also, a mark or a symbol indicating trouble is attached to the trouble component and a mark or a symbol indicating value is attached to the valuable component.

Also, a plastic component among previously removed components can be removed by the same method, for example, the same removal direction.

Also, a mark or a symbol representing recyclability and a material code are together attached to a plastic component of an electric appliance.

Also, a mark representing recyclability of an electric appliance and a material code are described by a convex or concave character with respect to a component and this convex or concave character is described in a direction capable of reading as a correct character on the front side of a component for an opaque component and reading as a correct character on the front side of a component or a correct character on the back side of a component when viewed from the front for a transparent component.

Also, in an electric appliance, an object component list of a previously removed component and an instruction diagram of this manual disassembling procedure are displayed or stored in a predetermined place of a product or a predetermined specific component.

Also, an information system of an electric appliance comprises design input means which can input structure design of the electric appliance and also can preset plural kinds of manually scrapped components capable of being disassembled by a tool or manually, the components being partial components of this structure, storage means for previously storing raw material unit prices of the plural manually scrapped components and scrapping time every component, and display means for displaying accumulation of the value amounts of manually disassembled components with a manual scrapping time lapse of the electric appliance from component information about plural components which can be manually disassembled and are inputted from the design input means and information stored in the storage means, and the design input means, the storage means and the display means are connected through communication means.

Also, in an information system of an electric appliance, in the case of discarding the electric appliance, a range of a manually scrapped component can be changed and also information stored can be updated.

Also, a recovery apparatus of an electric appliance comprises set value input means for presetting scrapping time of plural kinds of manually scrapped components capable of being disassembled by a tool or manually inside a structure of an electric appliance and also presetting the value amounts of the plural kinds of the manually scrapped components, calculation means for obtaining accumulation of the value amounts of the plural manually scrapped components with a scrapping time lapse of the appliance, and display means for displaying or recording to provide notification that scrapping cannot be performed within the preset scrapping time by accumulation of the value amounts every the scrapping time lapse.

Also, a recovery apparatus of an electric appliance comprises setting means for presetting scrapping time for manually scrapping plural kinds of manually scrapped components capable of being disassembled by a tool or manually without disassembling or crushing by machine at the time of discarding an electric appliance or recovering the electric appliance after use, display means capable of displaying kinds, positions, counts or scrapping procedures of the manually scrapped components by reading from the setting means or reading from storage means provided in the electric appliance or receiving information from the outside through communication means, and timer means for measuring work time for scrapping the plural kinds of manually scrapped components displayed by the display means and also providing notification of time of the preset scrapping time.

Also, a recovery apparatus of an electric appliance comprises time value record means for recording the value amounts of manually scrapped components of plural kinds preset as the accumulated amount with a scrapping time lapse.

Also, a recovery apparatus of an electric appliance comprises scrapping time record means for recording scrapping time of manually scrapped components of plural kinds preset.

Also, in a recovery apparatus of an electric appliance, setting means or display means or time value record means or scrapping time record means can make setting or display or recording remotely through a communication system.

BRIEF DESCRIPTION OF THE DRAWINGS

FIGS. 3(a)-3(m) are mark display explanatory diagrams according to one example of the invention.

FIG. 14 is a configuration diagram of room air conditioner outdoor device components according to one example of the invention.

FIG. 17 is a configuration diagram of room air conditioner indoor device components according to one example of the invention.

FIG. 20 is a removal explanatory diagram of refrigerator components according to one example of the invention.

BEST MODE FOR CARRYING OUT THE INVENTION

An embodiment of the invention will be described below based on the accompanying drawings.

First Embodiment

Figure 1:
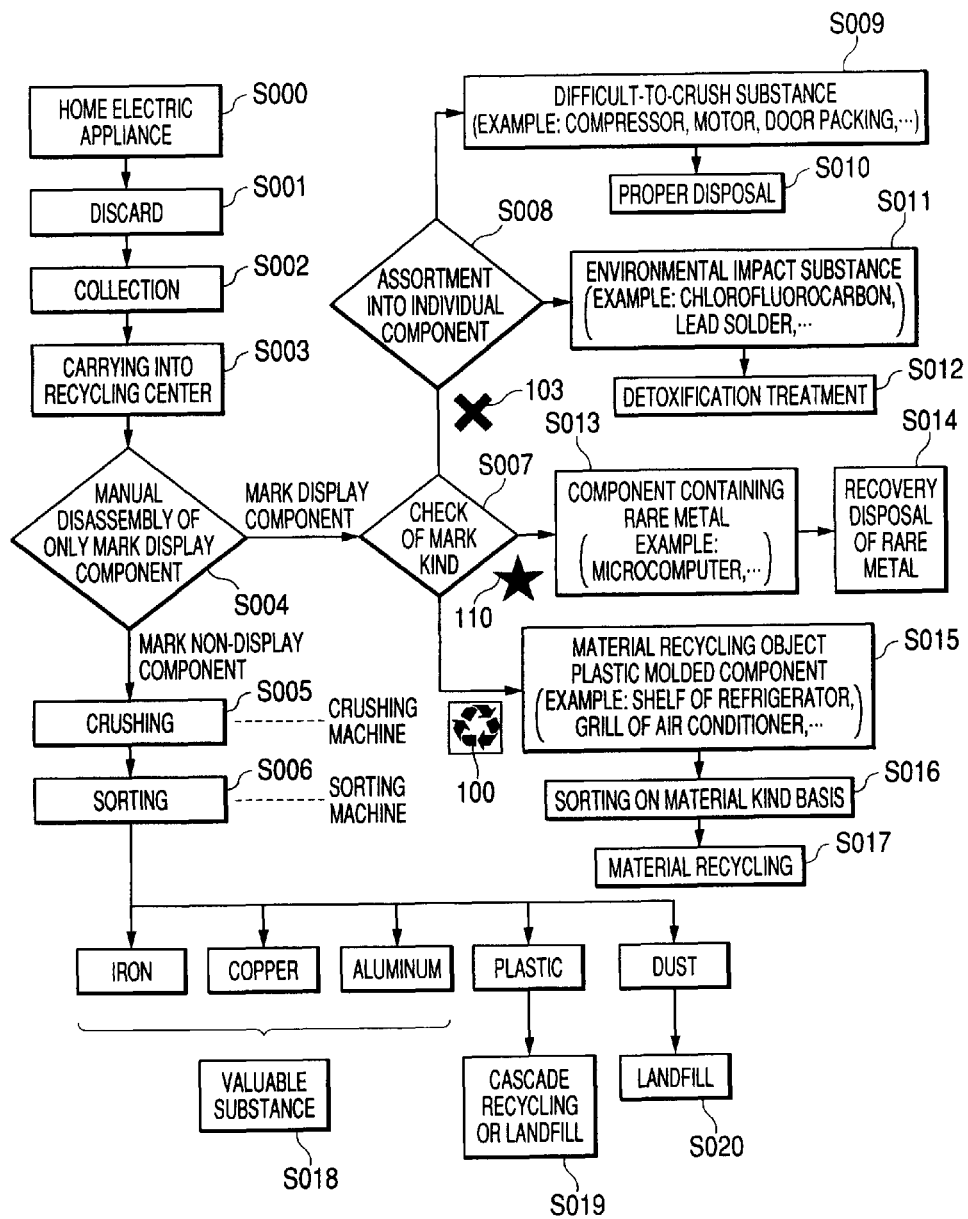
FIG. 1 is a flowchart of a recycling method according to one example of the invention.

FIG. 1 is a flowchart describing a recycling method of the invention. It is the flowchart showing disposal in waste home electric appliance disposal facilities such as a recycling center, and when a home electric appliance S000 is discarded S001 after the home electric appliance is used, waste products are first collected S002 by public institutions such as a city government, professional agencies for handling waste products, distributors of home electric appliances, manufacturers and so on. The waste products collected in a particular place etc. are carried S003 into the recycling center. In the recycling center, a structure easy to disassemble with respect to components to be disassembled directly manually or using a tool is previously adopted for electric appliances such as a television, a washing machine or air conditioning equipment brought as recycled products and also, a mark which means that this component is manually disassembled is displayed. Only this mark display component is manually disassembled S004. In this manual disassembly, for a refrigerator, for example, a door is opened and a plastic component of interior decorations on which a mark is displayed is removed, or a cover of a machine room in the lower rear of the refrigerator is pulled off by a screwdriver etc. and a fixed screw portion of a compressor which is fixed in the inside and is specified in a manually scrapped component is destroyed by a hammer and is removed. Also, in an example of air conditioning equipment such as an air conditioner, a body etc. which is a cover of the outer periphery is destroyed manually, or a front grill portion is removed and fixing of a manually scrapped component of the inside is removed by destruction etc. using a hammer etc. Also, display of a mark of a mark display component is shown on the component, but as described below, the display can also be performed by displaying the contents of electronic data on a screen to display the whole product or individual components. This manually disassembling work is constructed so as to measure work time by a timer.

The electric appliance such as the refrigerator after the manual disassembly is put into a large crushing machine installed in the recycling center as it is in a state of a body in which the manually scrapped component is removed or in a state in which a partial component is destroyed and disassembled is divided in plural portions, and is crushed S005 and is chopped up into fine clusters or fragments. The fragments are sorted S006 on a material basis, for example, iron, copper, aluminum, plastic, etc. by an air sorting machine using a difference in weight or a sorting machine for sorting by the presence or absence of response to magnetic force and soon. Except for the manually scrapped components, in this sorting, classification of valuable substances S018 such as iron, plastics while performing cascade recycling S019 for fuel oil etc., landfill S020 of dust or unrecovered plastics or the like, etc. is made and useful products such as the valuable substances are recovered.

On the other hand, in the mark display component disassembled manually, a kind of the mark is checked S007. The mark includes plural kinds of marks or symbols and the marks or symbols are constructed so that they can be individually separated, respectively and in this mark or symbol, an X mark 103 is made on trouble components such as a trouble component such as a difficult-to-crush component damaging a machine for crushing the electric appliance into fragments, a trouble component including a substance such as a permanent magnet causing an obstacle to a run of a machine, and a trouble component including a substance having a bad influence on environment, for example, environmental endocrine disrupters harmful to the human body. The components on which this X mark is displayed are further classified and are assorted S008 into individual components. This trouble component which is a manually scrapped component of the X mark assorted individually requires removal always before crushing, and has a structure easy to disassemble manually with respect to this component at a stage of design of the electric appliance. However, some trouble components include valuable substances capable of earning money, and others include inverse onerousness requiring a cost burden to post-treatment, for example, rendering the trouble component harmless after the classification, that is, inverse onerous substances, for example, paying cost of treatment to ask the treatment. These are displayed by one X mark, but naturally the valuable substances and the inverse onerous substances may further be divided by marks among the trouble components.

As another mark kind shown in FIG. 1, there is a component containing expensive rare metal such as gold or a component S013 such as a microcomputer or a special semiconductor capable of selling at a high price, and a ☆ mark 110 is attached to such a component containing rare metal etc. or a substrate holding board or a substrate in which the component is mounted, and recovery disposal S014 of the rare metal etc. is performed. Further, as another mark, a recyclable mark 100 adopted by ISO014021 is introduced. This is a component of an object of material recycling in which material is recovered and using this material as raw material, the material is recycled to new material, and iron, copper, aluminum, etc. as described in the valuable substances S018 of FIG. 1 are included and as material recycling object components from the manually scrapped components, a shelf of a refrigerator or a grill of an air conditioner, etc. targeted for plastic molded components S015 are given. These plastics are sorted S016 on a material kind basis and material recycling S017 is performed.

In the recycling method of FIG. 1, a mark or a symbol is displayed to a manually scrapped component capable of being disassembled by a tool or manually without disassembling or crushing by machine at the time of discard or recovery after use and by performing crushing by machine after manually scrapping this manually scrapped component, it can be separated into plural kinds of substance on which a cost burden is imposed and valuable substance after recovery. In addition, when this mark is attached or described at a design stage, it can be constructed so that the manually scrapped component to which the mark is attached can be simply removed previously. For example, a plastic component of a manually scrapped marked component of a door inside a refrigerator can be disassembled simply by lifting the plastic component upward while pulling the plastic component to this side, and also a disassembling procedure for removal in order of upper components is preset.

In a mark or a symbol, by attaching a mark or a symbol to a trouble component damaging a crushing machine, a trouble component including a substance causing an obstacle to a run of a machine and a trouble component including a substance having a bad influence on environment, an obstacle to recycling work is not caused and environment can be protected. Further, a compressor or a motor is constructed so as to be removed by as small manual work as possible. Also, as shown in FIG. 1, another mark or symbol is attached to a component including a substance having recovery value and a valuable recycled component and also this disassembly is constructed so as to remove the component as specified order along with the trouble components. As a result of this, a component defined within specified time can be scrapped. Incidentally, in a marked component having recovery value, marks may be attached to all of the components scheduled to be removed by manual scrapping, but marks are attached to a scheduled number or larger of components in which manual scrapping is planned, and a manual scrapping worker of the recycling center may be informed of this planned number and the planned manually scrapped components in another form. Another form may mean that a kind of a mark is changed or is read out of a storage element attached to a product, or may mean a form in which a manual scrapping range planned is shown by a drawing attached to a product or information is acquired by communication means and is displayed. As a result of this, in a plan idea at a point in time of design, data of preset conditions probably changes remarkably during an electric appliance use period of several years or ten years or fifteen years. For example, it is assumed that a price of iron or aluminum changes or the standard scrapping time per time changes. Or, there is a situation unexpected at a point in time of design, for example, remarkable deformation, and a recycling recovery method capable of flexibly coping with such a change can be obtained.

Figure 2A:
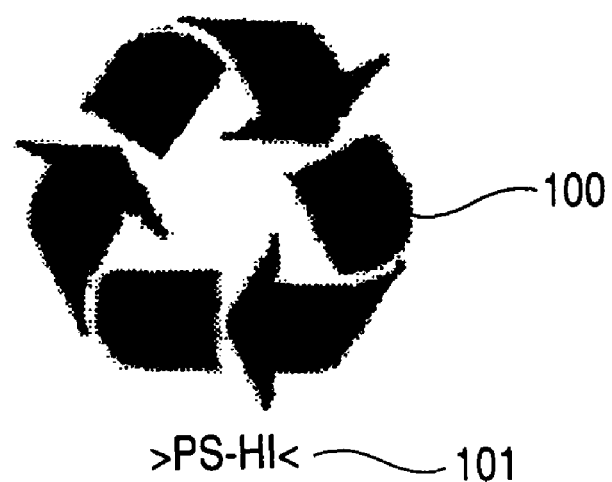
FIGS. 2(a) and 2(b) are mark display explanatory diagrams according to one example of the invention.
Figure 2B:
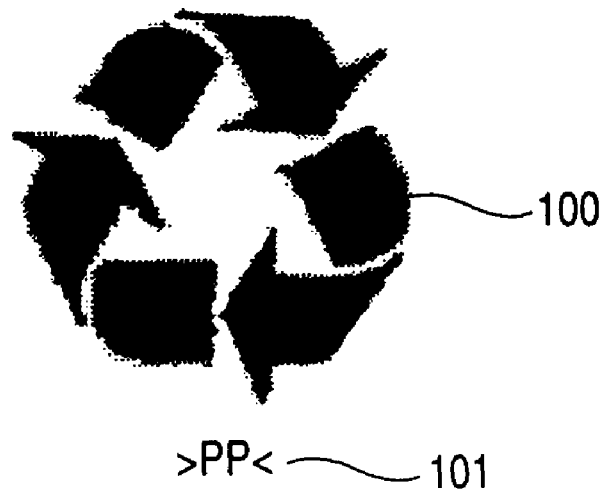

FIGS. 2(a)-2(b) and 3(a)-3(m) show display examples of various marks. FIGS. 2(a) and 2(b) are examples attaching a recyclable mark 100 of a plastic component and a material code 101 of its component in combination, and the recyclable mark 100 is described in conformance with ISO14021 and the material code is described in conformance with ISO11469. FIG. 2(a) is an example displayed on a polystyrene molded product of a high impact type, and FIG. 2(b) shows the case of being displayed on a polypropylene molded product. FIG. 3(a), FIG. 3(b), FIG. 3(c), FIG. 3(d) and FIG. 3(e) are marks showing difficult-to-crush substances, and any mark may be used respectively, but a unified mark could be used with respect to a product. FIG. 3(a) is an X mark 103, and FIG. 3(b) is an idea for making meaning clear by an X CRUSH mark, and FIG. 3(c) is an idea for substituting a no-parking mark 105, and FIG. 3(d) is a circle difficult mark 106, and FIG. 3(e) is an idea for making an X mark 107 on a crushing machine model diagram.

FIG. 3(f), FIG. 3(g), FIG. 3(h) and FIG. 3(i) are display examples of environmental impact marks, and FIG. 3(f) is an X mark 103, and FIG. 3(g) is Harmful 108 which is a word for indicating danger, and FIG. 3(h) is an idea for substituting a no-parking mark 105, and FIG. 3(i) is a pollution mark 109. FIG. 3(j), FIG. 3(k), FIG. 3(l) and FIG. 3(m) are examples of marks of components with high recovery value, for example, rare metal, and FIG. 3(j) is a ☆ mark 110, and FIG. 3(k) is a RARE mark 111, and FIG. 3(l) is a hexagonal mark 112, and FIG. 3(m) is a circle gold mark. There are various mark ideas thus, and thereby a selection can be made properly when misleading display is performed due to a pattern etc. of a mark mounting portion depending on components of an electric appliance.

In the case of examining an easy-to-recycle product with a minimum of cost in order to enhance environmental suitability of an electric appliance actually, there are the following problems in the case of designing a product or the case of doing recovery work in the field of recycling. In order to solve such problems, extraction of issues at the time of the current scrapping disposal, extraction of important points and unimportant points of measures and grasp of cost versus effect of improvement measures are required.

Figures 4, 5:
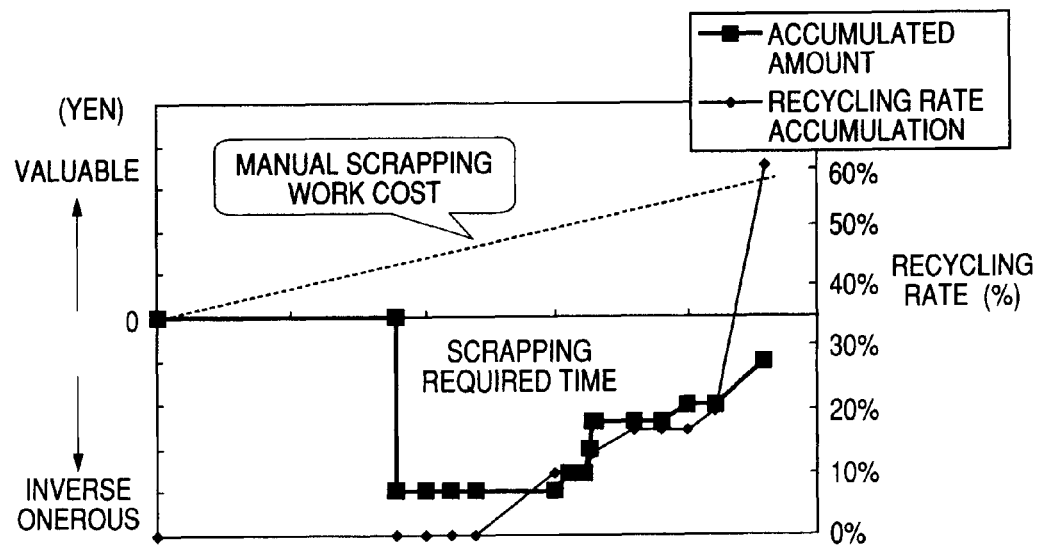
FIG. 4 is a profit and loss balance explanatory diagram of recycling activity according to one example of the invention.
FIG. 5 is a diagram of relation between scrapping time and a recycling rate and scrapping cost according to one example of the invention.

(1) The point in design structure to achieve simplification of scrapping (2) Guidelines for selection of components to change material (3) Assessment of cost versus effect and a grasp method of recovery effect (4) Assessment of correlation between recycling rate achievement and generation disposal cost In this case, it is necessary to tentatively decide an idea of the standard plant in the recycling center. On the basis of that, it is necessary to quantitatively grasp a profit and loss influence and an influence of easy-to-recycle design. Then, an idea for solving the problems is described. First, it is necessary to divide cost generated in connection with recycling, and waste substances and recyclable materials generated by scrapping separation disposal are divided into "revenue" and "expenditure" as shown in FIG. 4. FIG. 4 is a diagram showing a profit and loss balance of recycling activity, and substances which produce value and substances which do not produce value among substances generated by the scrapping separation disposal are divided into "valuable" and "inverse onerous" and are allocated to the revenue side and the expenditure side, respectively. As a result of this, the profit and loss balance of recycling activity is represented in the form including also measure cost reflected on product cost. Incidentally, it could be examined whether or not this measure cost is included as necessary. A user burden amount in FIG. 4 means cost paid to discard an electric appliance in the case of discarding the electric appliance. This results in revenue of a scrapper for scrapping the discarded appliance.

As the standard plant in the recycling center, raw material separation of crushing by machine and partial separation by manual work is assumed and both of them are selected while balancing three sets of a recycling rate, economical efficiency and an environmental load factor. In this case, it is desirable to perform scrapping manually with reference to a portion requiring special disposal since large harmful substances are included, a relatively valuable portion and a portion having a bad influence on a post-process of work as shown in FIG. 1. Since an evaluation method effective in assessing this cost versus effect is devised, its method is shown in FIG. 5. FIG. 5 shows "manual scrapping process" by a time lapse using the axis of abscissa as "time" and the axis of ordinate as "cost" and "recycling rate". Two broken lines in FIG. 5 are recycling rate transition and valuable and inverse onerous accumulated amount transition changing with advance of manual scrapping. Points in the lines show manual scrapping work every component. Further, a straight line upward to the right shows work cost necessary for manual scrapping work.

FIG. 5 shows one example and first, the recycling rate is a rate of recyclable weight to product weight and as shown in FIG. 5, since there is no recovery at the beginning of manual scrapping time, a recovery rate is low but the recovery rate increases gradually and results in about 50 to 80%. In the case of recovering a main portion by mechanical crushing performed after manually scrapped components depending on a kind of a product, an extremely high recycling rate cannot be obtained for time in manual scrapping work. Also in the accumulated amount of recovery components scrapped manually, destruction work etc. for taking out its component is first done and work for removing a trouble component to be removed is next done and this trouble component, for example, an environmental impact substance requires cost of detoxification and a component including material such as vinyl chloride of door packing requires separation treatment and, for example, it is necessary to pay a special agency and minus cost is caused due to inverse onerousness. Then, when valuable substances are manually disassembled and recovered, the minus cost begins to be accumulated to the plus side.

Manual scrapping work cost increases with time for which the workers work based on cost of manpower necessary for manual scrapping. Parts of other indirect cost or equipment depreciation cost, etc. as well as personnel cost are added to this cost and the cost may be cost per time. When it is assumed that cost per time is constant and the number of workers is constant, the manual scrapping work cost becomes a straight line with work time as shown by a dotted line of FIG. 5, but may become a broken line shape etc. depending on a level of work contents or the number of workers. The final accumulated amount of money at the time when a predetermined component manually scrapped can be scrapped or at the time of reaching predetermined time is the amount of money in which the scrapped component is converted into recoverable value, and this amount probably becomes a minus as shown in the drawing or becomes about zero, or value probably becomes a plus. In order to balance revenue with expenditure, even except for measure cost of a product described in FIG. 4, unless the sum of the final accumulated amount and the burden amount paid at the time of discard by a user who has used this home electric appliance discarded balances with at least expenditure such as manual scrapping work cost and other expenditure cost, success is not made as business. Of course, there are various costs of business accomplishment, for example, costs of equipment or crushing work by machine as the other expenditure.

Figure 6:
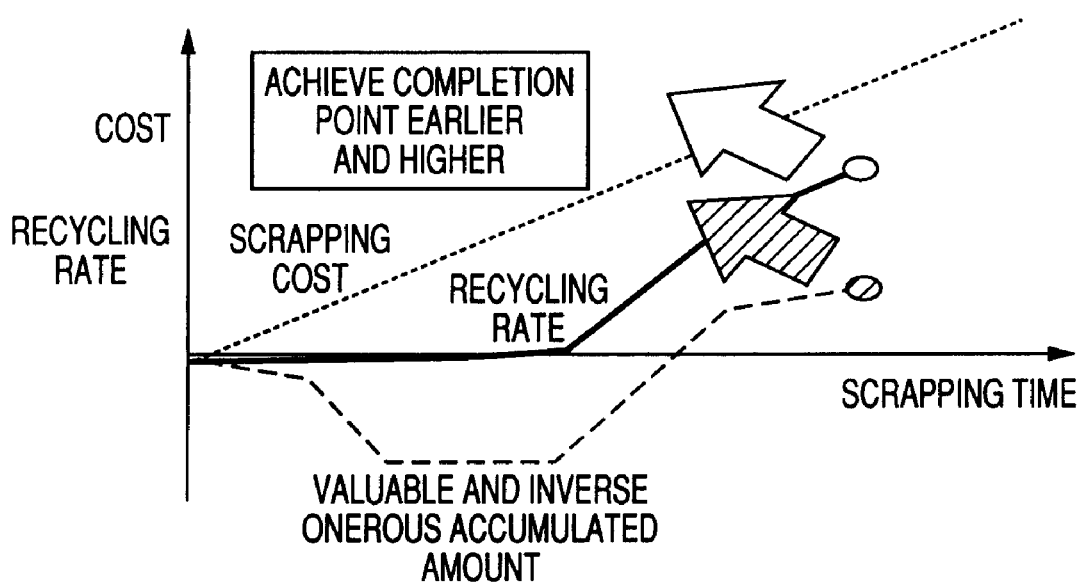
FIG. 6 is a diagram of relation between scrapping time and a recycling rate and scrapping cost according to one example of the invention.

From the above, in the case of performing recycling business, a trouble component must be removed previously before crushing by machine and unless this manual scrapping work cost is covered by revenue of the recycling business, enormous cost must be spent for environmental measures and environmental protection stagnates and protection of global environment is delayed and consequently, remarkable loss is caused. As a result of this, expenditure meeting revenue is required, and structure design of a product or equipment of the recycling business or work contents present challenges. This basic idea is shown in a diagram of relation between scrapping time and a recycling rate and scrapping cost of FIG. 6. FIG. 6 is a schematic diagram of FIG. 5 and first, in order to increase a recycling rate, for an air conditioner or a refrigerator, etc., valuable substances as many as possible, for example, plastics which are not very useful after crushing want to be scrapped in the case of manual disassembling before crushing by machine. However, when too long time is taken to perform this scrapping, scrapping cost becomes too high and expenditure does not meet revenue. As the scrapping time is shortened, the expenditure decreases accordingly. However, it is found that the final accumulated amount at that time could be set to the target amount meeting a profit and loss balance of recycling activity, that is, a target value derived from a balance on business accomplishment.

When the above is put together from FIGS. 5 and 6, a completion point of manual scrapping work, that is, a point at which the final accumulated amount is obtained needs to be achieved earlier and higher, that is, the amount obtained by recovery needs to be increased in a short time, and there is the following point.

(1) A total value of recycling rates obtained by manual scrapping and mechanical separation must exceed a set criterion, for example, at least a law criterion.

(2) Cost revenue and expenditure generated by scrapping disposal can be seen from the amount of difference between manual scrapping work cost and the accumulated amount. Conversely, it is necessary to clear cost effect of recycling business, that is, a target value in view of a balance of revenue and expenditure.

(3) A process in which a broken line shows upwardness to the right is a process producing value, and a downward or sideward process is a loss process. That is, introduction of recycling equipment or product design capable of implementing the process upward to the right at the previous stage of manual scrapping is the point of cost reduction.

Though the plot instance of the diagram of relation between the time and the cost and the recycling rate as shown in FIG. 5 or FIG. 6 has been used for description since the case of manual scrapping is essential, similar comments apply to work using equipment such as machinery. By such one chart, a problem of cost effect on scrapping separation having an object product can be seen visually, so that firstly, a target to put effort into improvement becomes clear at a design stage and also cost invested in taking measures and balance improvement which is its effect can be evaluated. For example, when there are a three-dimensional CAD of product design and a personal computer capable of calculating and displaying this chart at the design stage, easy-to-recycle design and product design effective in recycling business while satisfying environmental protection measures simply can be implemented at low cost. Secondly, it can be decided whether or not work has been done as shown by set information about scrapping time and scrapped components which are information acquired previously on the basis of this chart in the field of the recycling business, that is, the scrapping work field. Based on this decision, a balance of the recycling business can be checked and also measures against the case of causing loss can be taken quickly and also when measures against the case that work has not been done as shown by the chart are taken previously at the design stage, flexible scrapping work capable of satisfying cost versus effect can also be done.

By the above idea, a problem on scrapping separation having an object product can be seen visually, so that a target to put effort into improvement becomes clear at a design stage and also it can be evaluated whether or not cost invested in taking measures meets balance improvement obtained by scrapping separation improvement. As a result of this, recycling disposal cost can be decreased by the following means etc., and cost and effect of recycling business improve. That is, in the case of recovering and recycling a home electric appliance, a mark is attached to a previously removed component and the component is distinguished from another component and thereby a worker can make a visual check directly and can do work quickly. In this previously removed component, accumulated transition of value of the removed component is shown with respect to a lapse of time taken for removal and is compared with time work cost of a previous removal process and thereby an object component is determined, so that necessary scrapping work can be done in necessary time and occurrence of useless time can be prevented. The previously removed component includes a component which may cause trouble in the case of being put into a crushing machine, and a possibility of causing an equipment failure is eliminated. The previously removed component includes a component made of raw material having an influence on environment, and a problem on global environmental protection is not caused. The previously removed component includes a component having rare metal, and the amount of money recovered can be increased. The previously removed component includes a plastic molded component in which material recycling is performed. All of the plastic molded components in which material recycling is performed can be removed by the same method, so that work time can be shortened. A raw material of the plastic molded component in which material recycling is performed is any of polypropylene, polystyrene, high impact type modified polystyrene and acrylonitrile-butadiene-styrene copolymer, and is easy to recycle. A mark representing recyclability and a material code are together attached to the plastic molded component in which material recycling is performed, and the plastic molded component is easy to find and a speedup in separation is achieved. The material code is easy to see by displaying the material code in the vicinity of the recyclable mark or in a position axisymmetrical to the recyclable mark, so that work is done quickly. The mark representing recyclability and the material code are described by a convex character with respect to a component and are easy to find even after long-term use and work is done quickly. The convex character of the mark representing recyclability and the material code is described in a direction capable of reading as a correct character on the front side of a component for an opaque component and reading as a correct character on the back side of a component when viewed from the front for a transparent component, and is easy to find and work is done quickly. An object component list of the previously removed component or an instruction diagram of a disassembling procedure is explicitly shown in a predetermined place of a product or a predetermined specific component and, for example, work is facilitated.

Figure 7:
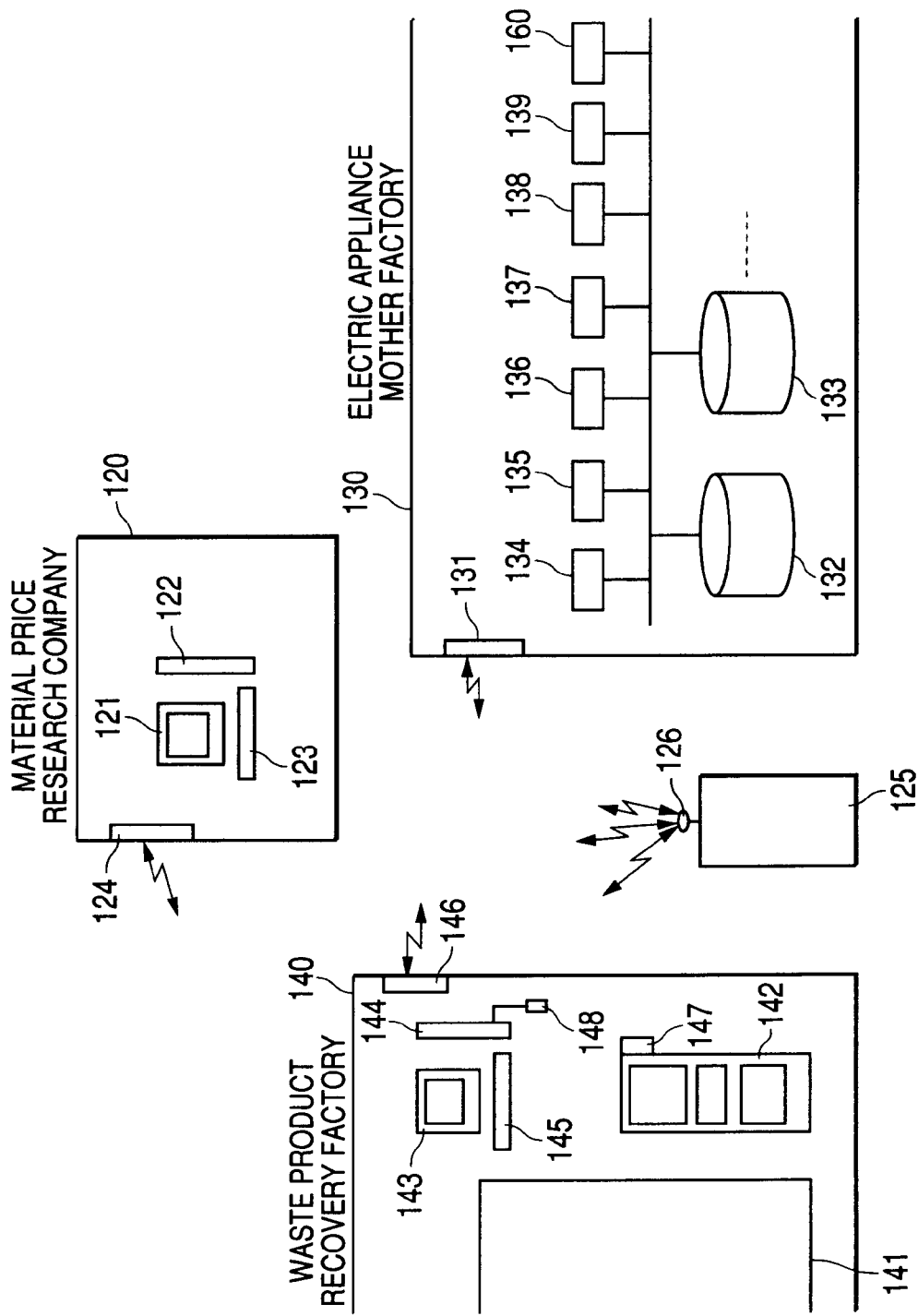
FIG. 7 is a configuration diagram of a waste product recovery system according to one example of the invention.

FIGS. 7 to 10 are diagrams explaining a recovery apparatus and a recovery method in a waste product recovery factory which is the field of recycling business. FIG. 7 is a diagram explaining a configuration of the whole system including the waste product recovery factory and in FIG. 7, numeral 120 is a research company for acquiring the latest data such as material prices and communicating with necessary departments etc., and research results are put together by a display device 121, a personal computer body 122, an input device 123, etc. and are transmitted by a communication device 124. This communication is relayed by an antenna 126 of a communication station 125 and is transmitted. Numeral 130 is a mother factory of an electric appliance, and the electric appliance is designed and manufactured and also data of the appliances manufactured in the past is stored. Also in this factory 130, databases 132, 133 for storing a large number of data such as drawings together with a display device 134 connected to a communication device 131, an arithmetic storage device 135, an input device 136, a display device 137, a three-dimensional CAD device 138 for creating a design drawing and making structure examination, weight calculation, cost calculation, etc., a design drawing input device 139, a drawing output device 160, etc. are connected and are used for communication etc. with remote related departments and many affairs within the mother factory. Numeral 141 is crushing equipment which performs mechanical disassembly and is provided in a recovery factory 140 for disassembling and recovering a waste product 142, and numeral 144 is a personal computer body which is provided in the manual disassembling field and intercommunicates with a reading device 148 for reading information (for example, which portion is manually disassembled and what material is included, etc.) about this waste product from a display device 143, an input device 145 and a storage medium attached to the waste product 142 and is used for scrapping work.

Figure 8:
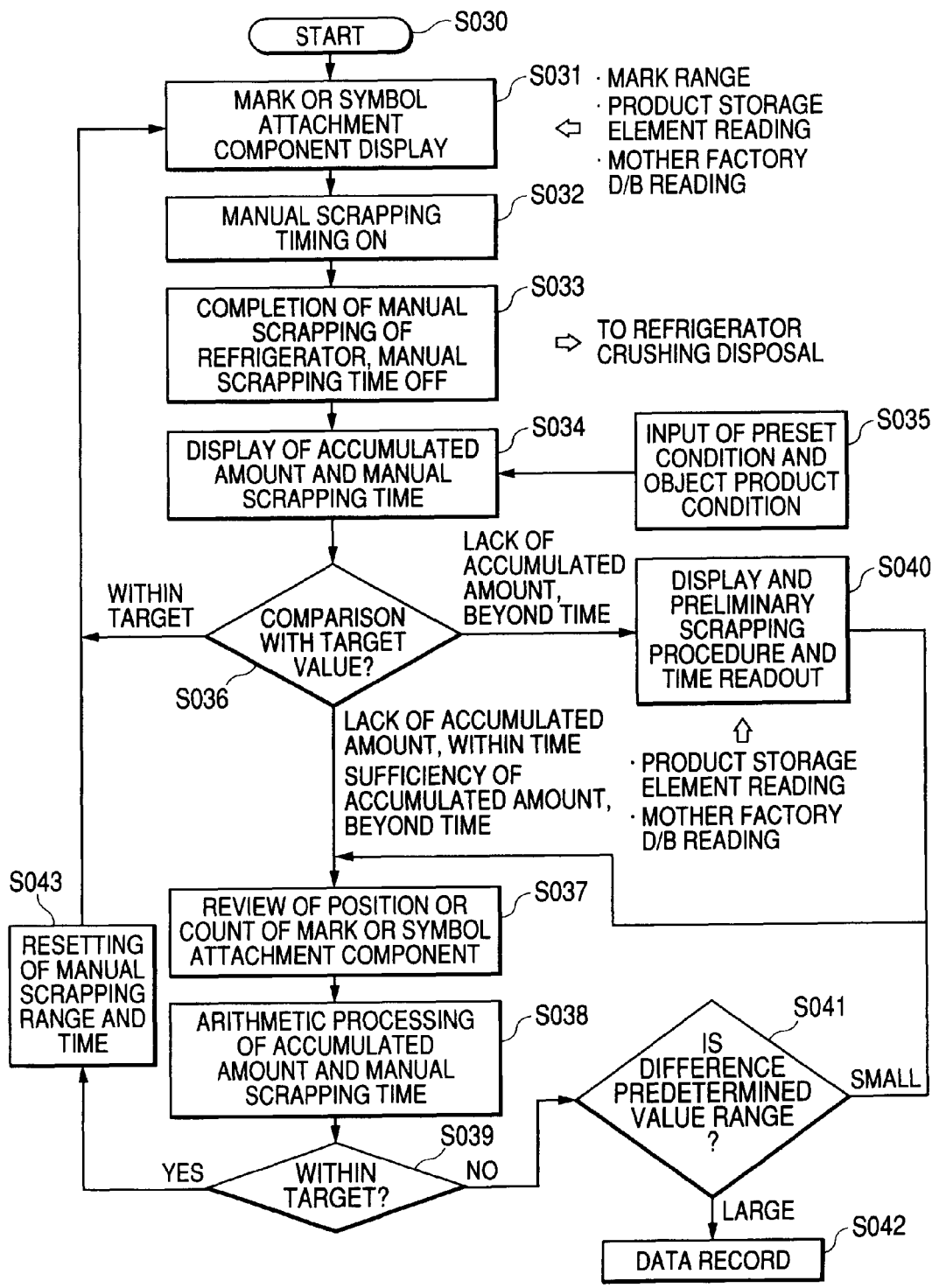
FIG. 8 is a flowchart of manual scrapping according to one example of the invention.

FIG. 7 explains a system about recycling, and the recovery factory 140 receives a waste product, and carries out valuable substances or dust, and also receives data about the waste product or prices of raw materials after the latest scrapping necessary for recycling business such as scrapping or factory management from the outside through communication, and does work. FIG. 8 is a flowchart describing a procedure of an operation of this recycling system. When a waste product is installed in a manual disassembling place and a start is made S030, display S031 of a mark of each component of the waste product 142 is checked and manual scrapping timing is turned on. A start of this timing may be turned on by detecting a state in which the waste product is set in a predetermined position or by turning on a switch of a scrapping work start. The start of the timing may be turned on at the time when the personal computer body 144 reads information from a storage medium 147 such as a storage element attached to the product and other than the mark mounted on the component through the reading device 148 and displays the information on the display device 143. Or, the time when product specifications such as a product code or a product number of the waste product 142 are inputted to the input device 145 and are stored in the personal computer body 144 or are used for communication with the mother factory may be used as the start time.

This manual scrapping timing is turned off S033 at the completion of manual scrapping. In a refrigerator etc. which is a waste product, manually disassembled valuable substances or trouble components are removed and the refrigerator is put into crushing equipment as it is and is fragmented. The manual scrapping time is displayed S034 on the display device 143 as it is and also the accumulated amount of money can be calculated and displayed by inputting the disassembled and recovered components. If product use is inputted, the time and the accumulated amount are automatically displayed or stored S034 so that display can be performed during a process in which the standard scrapping procedure advances. In this case, preset conditions or object product conditions such as product use are inputted S035. The accumulated amount and the scrapping time are compared S036 with target values by an arithmetic processing device inside the personal computer body 144 and it is decided whether scrapping is performed within target time and a target accumulated amount can be attained, or whether any one of the target values cannot be attained, or whether both of the target values cannot be attained. When a measured value or a calculated value clears the target, then disposal of the next waste product is taken up and it again starts from display S031 of a mark by inputting product specifications, for example, the fact that a waste product is a refrigerator.

In the case of being in a state in which any one of the target values cannot be attained, for example, the accumulated amount of the accumulated recovery products is lacking or the scrapping time exceeds a schedule, arithmetic processing S038 of review of a position or a count of a component to which a mark or a symbol is attached is performed so that the target values can be reached by an arithmetic processing portion inside the personal computer body 144 and the review is displayed on the display device. This arithmetic processing includes review of a position or a count of a valuable component scrapped, and data for performing simulation and arithmetic processing of time and the amount of money by this review may be inputted from the input device 145, or may be fetched from a storage portion inside the personal computer or the storage medium 147 or the databases 132, 133 etc. of the mother factory 130. With respect to predetermined components displayed on the display device as these data before manual scrapping, marks are attached to components larger than the predetermined components or the components are stored and from among the components, a count and a position of a manually scrapped component of said product are newly reviewed and the contents of manual scrapping disposal capable of attaining a target value, for example, scrapping time is calculated in favor of keeping a predetermined range and then, a scrapping procedure, time or an object component which is a valuable substance at the time of scrapping disposal of this product are reviewed.

By a decision S039 as to whether or not the accumulated amount and the scrapping time reviewed and simulated are within the target values, when the target values are satisfied, a manual scrapping range and scrapping time are reset S043 with respect to said product. Further, in the case of measuring and deciding a situation in which the accumulated amount of the recovery products is lacking and also the scrapping time exceeds a schedule and there is a problem with recycling business, a preliminary scrapping procedure idea read from the database of the mother factory or a medium such as the storage element attached to the product is displayed and from the amount of money and time in which this procedure idea is simulated, an examination for reviewing scrapping disposal of scrapping is made. By performing display on the display device, making preparation previously or knowing data at the time of manufacture through communication, review of components to which marks etc. are attached, review of a scrapping procedure, etc. can be made based on such an examination result, so that such an exceptional examination on survival of the business can be made speedily before loss runs up. In steps S037, S038 and S039, a count, a position, a procedure, etc. of a manually scrapped component are reviewed and as a result of simulation, when it is decided that a target is not reached, resetting S043 is made by another review S038 unless this difference is a numeric value too much deviating from a predetermined range S041 which is a limit allowed in the case of doing recycling business.

However, when this difference is large, data is stored S042 and further a detailed examination or simulation is performed for arrangement with a manufacture department or arrangement with a waste product recovery department. Incidentally, when attachment of a mark or a symbol to a waste product is limited to a manually scrapped component, the contents displayed in step 036 are analyzed and are reported to a department related to affairs of scrapping business or recycling business and improvement can be made.

Figure 9:
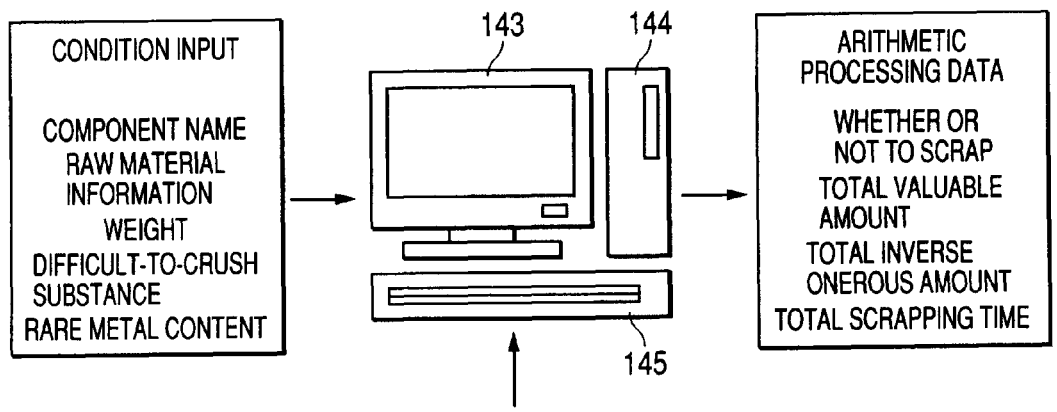
FIG. 9 is an explanatory diagram of a manual scrapping disposal calculation display device according to one example of the invention.

FIG. 9 is a diagram explaining a personal computer device for performing processing of display, storage, calculation, etc. inside a recovery factory, and as condition input, there are basic data such as a component name, raw material information and weight of a manually scrapped component and the scrapping conditions, for example, a difficult-to-crush substance, rare metal content, etc. and these may be inputted from an input device 145 or may be read from data stored in another storage device previously. Similarly, as preset conditions, valuable amounts of raw materials, standard scrapping time every component, standard scrapping cost per time, a product standard scrapping procedure, a component name, etc. are stored and set. When specifications of a waste product are inputted, these are displayed and when standard work is done as this procedure, only a lapse of time and a structure of the waste product are displayed and a result as to whether to be within a target value after the completion of manual scrapping is shown by time and is outputted as arithmetic processing data and becomes a first target value. However, the preset conditions may be modified by information from a research company etc. through communication in response to variations in the trade market in the world. A result in which the product specifications and other conditions are inputted and the preset conditions are read from a storage device and are calculated is stored and displayed and also is compared with preset scrapping time. However, in the case that a value preset by the preset conditions etc. does not match during product use or calculated data does not match though a change is made by input on the way, or for improvement in profit and loss of recycling business, a count, a position and a procedure of a manually scrapped component are improved and data is changed by input including the procedure and scrapping is newly simulated and the recovery amount of money and scrapping time which are this result are displayed S034. The time and the amount of money are compared S036 with measured time as a second target value.

Figure 10:
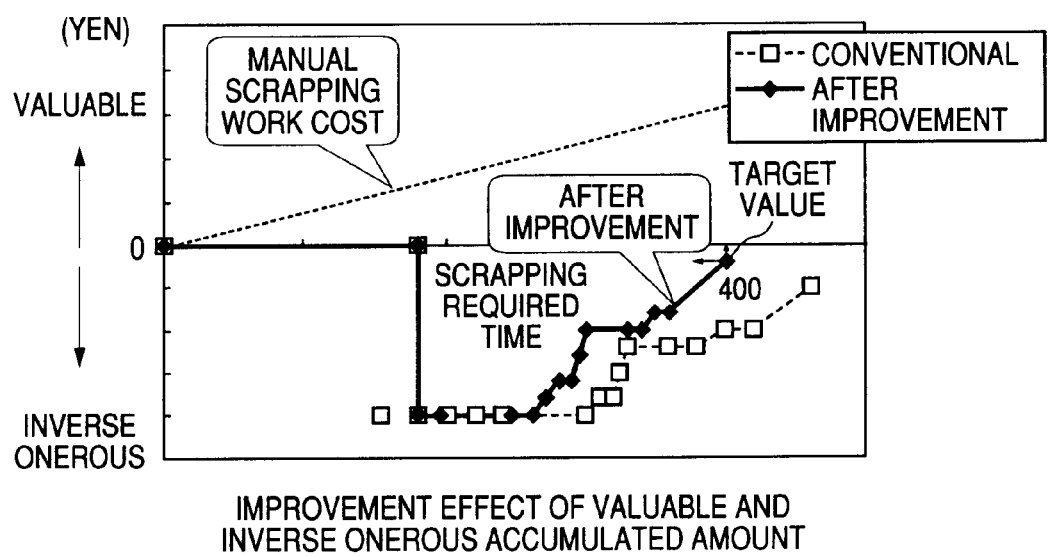
FIG. 10 is an improvement effect explanatory diagram of valuable and inverse onerous accumulated amounts according to one example of the invention.

FIG. 10 is an example in which an arithmetic processing result in which manual scrapping work cost and the recovery accumulated amount with a lapse of manual scrapping time are obtained based on the data at a point in time of product manufacture previously is used as a conventional result and a simulation result obtained after preset conditions are reviewed and scrapping procedures or scrapped components are reviewed to improve profit and loss is used as a result after improvement and both results are compared and displayed on a display device. The final accumulated amount 400 is not improved too remarkably, but scrapping time is shortened and is achieved earlier.

Figure 11:
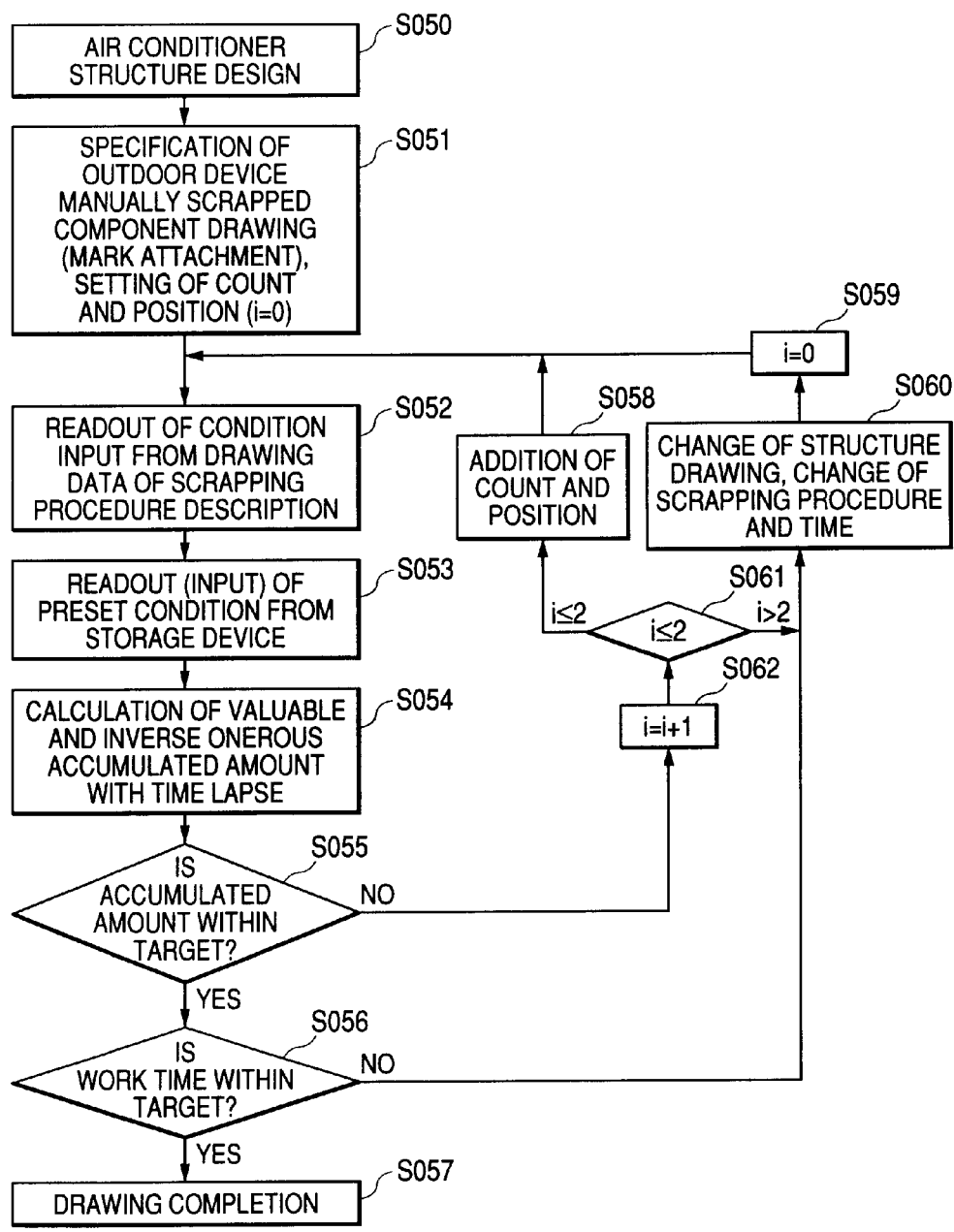
FIG. 11 is a flowchart of manual scrapping evaluation according to one example of the invention.
Figure 12:
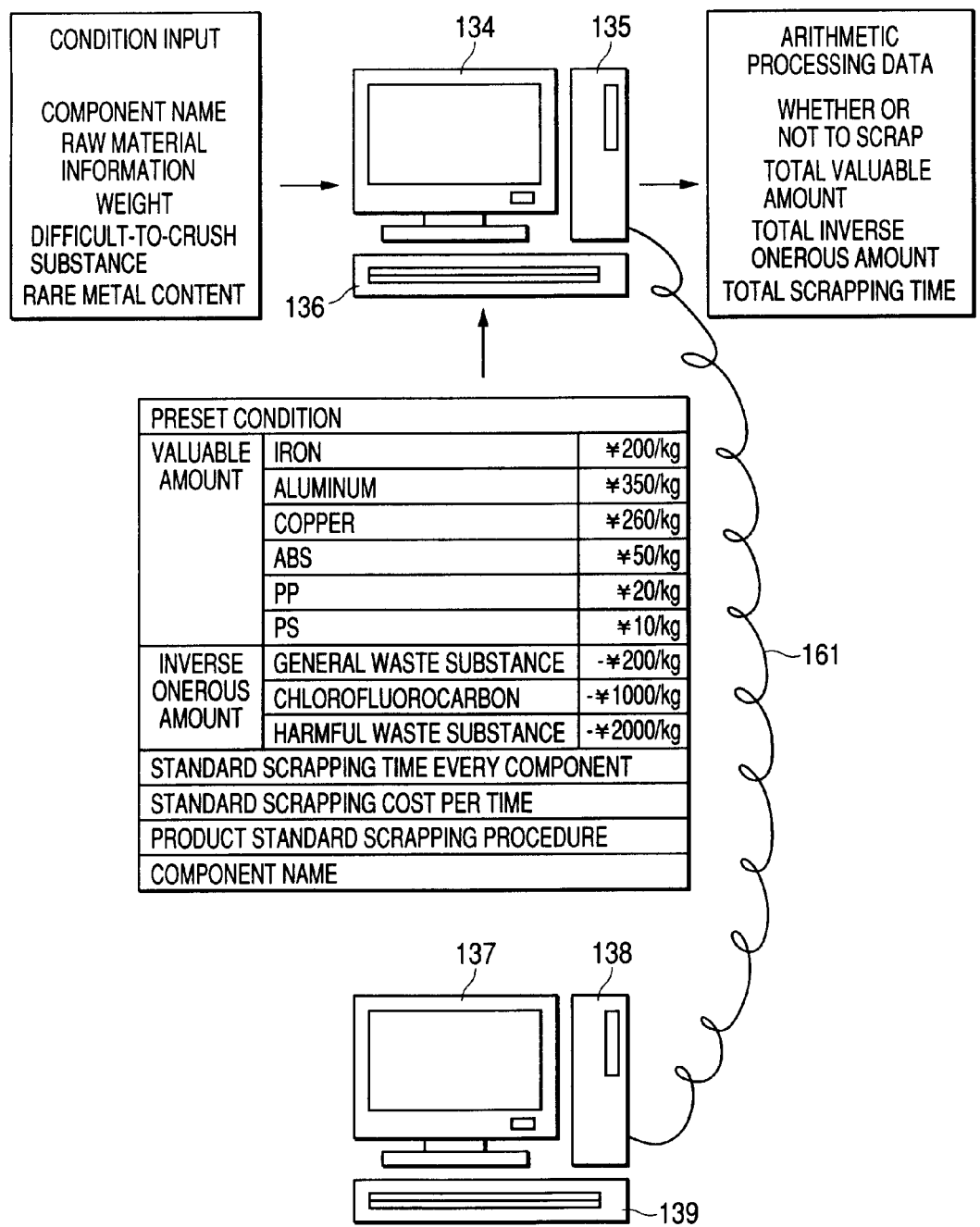
FIG. 12 is a configuration diagram of recycling information processing according to one example of the invention.

FIGS. 11 and 12 are explanatory diagrams for performing environmental suitable type product development using a recycling-capable design support tool in an electric appliance mother factory. An electric appliance mother factory 130 is provided with many processing devices such as databases 132, 133, an arithmetic processing device 134 and a display device 137. FIG. 8 is a flowchart for performing recycling-capable design by these processing devices, and FIG. 9 is an explanatory diagram of devices for performing the processing. In the drawing, an arithmetic storage device 135 for performing recycling-capable support has a display device 134 and an input device 136 and also is connected to a three-dimensional CAD body 139 through a communication line 161. This three-dimensional CAD body 138 is connected to the display device 137 and a design input device 139, and creates a design drawing while examining a product structure. Further, a raw material or specific gravity can be inputted to calculate weight of a component whose size is set.

Figure 13:
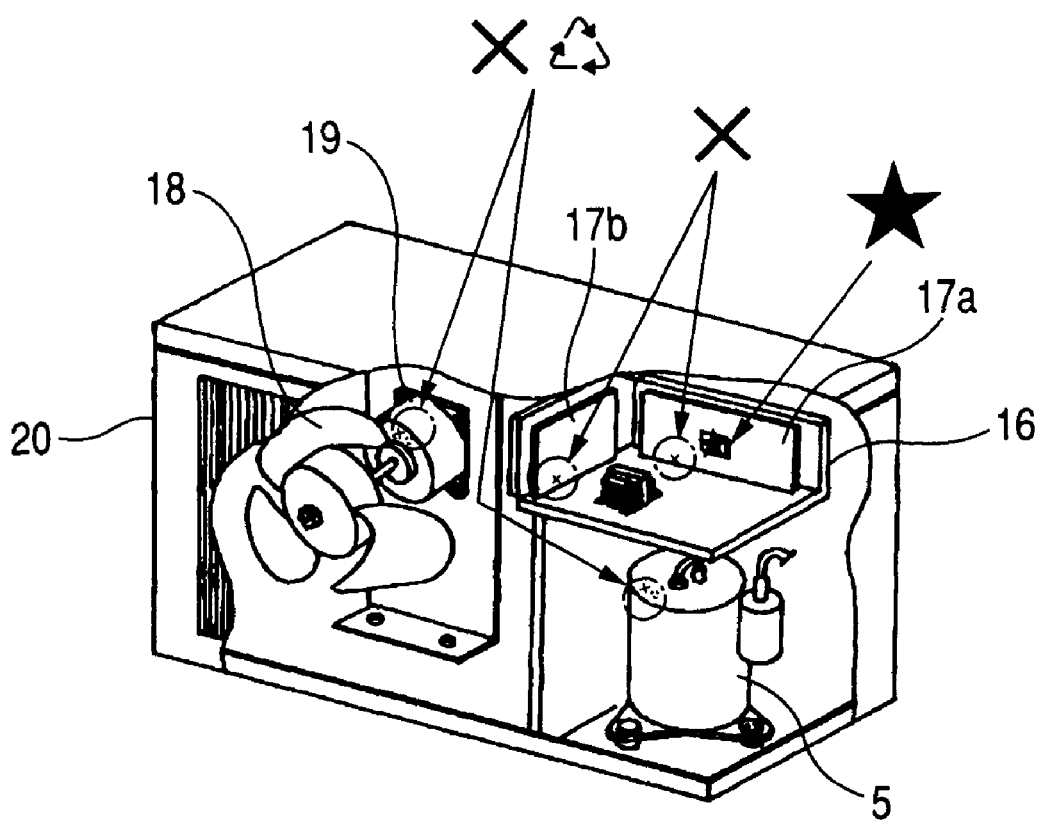
FIG. 13 is a conceptual diagram of a room air conditioner outdoor device according to one example of the invention.

Next, FIGS. 13 and 14 will be described. In S050 of FIG. 11, while using arithmetic processing of the three-dimensional CAD body 138 and viewing the display device 137, a shape is inputted by the design input device 139 and air conditioner structure design is performed and based on this, recycling disposal of a room air conditioner is described by way of example. FIG. 13 is a diagram showing an outline of a configuration of an outdoor device. Also, an exploded structure of this outdoor device and each component name are shown in FIG. 14. As shown in FIG. 13, numeral 16 is an outdoor electric product box which is provided in the upper portion of a compressor 5 inside an outdoor device 20 and slidably mounts an outdoor control board equipped with a microcomputer etc. Numeral 18 is a fan rotated and driven by a motor 19. Also, as shown in FIG. 14, in the outdoor device 20, an outer enclosure is formed by a front cover 2 made of iron, a base 3, a back panel 9 and a top panel 14, and each the panel can be disassembled manually using a tool. Further, a fan cover 1, a service panel 8 and a condenser net 12 in which material is unified by, for example, polypropylene which is plastic are mounted in each this panel.

The compressor 5 mainly comprising copper alloy etc., stop valves 6, 7, a pipe assembly 10 are included in the inside of the outdoor device 20, and space among a machine room for assembling a four-way valve, a motor support for supporting a motor fan and a ventilation room for placing a heat exchanger is partitioned by a separator made of iron. When a pawl portion hooked and engaged among the top panel 14, the front cover 2 and the back panel 9 is removed in this structure, the outer enclosure is released and the inside becomes bare.

As valuable substances recyclable in the room air conditioner outdoor device 20, there are the fan cover 1, the front cover 2, the base 3, the separator 4, the stop valves 6, 7, the service panel 8, the condenser net 12, the motor support 13, the top panel 14, the heat exchanger 15 and soon. A recycling code 100 is attached to these as described in FIG. 14. Also, as a substance including an environmental impact substance, an outdoor control board 17 includes lead, so that an X mark 103 indicating a substance having a bad influence on environment is inscribed on the outdoor control board 17, and further a ☆ mark 110 indicating that rare metal is contained is inscribed on a microcomputer portion on the outdoor control board. Further, the compressor 5 and the motor 19 to which a recycling code 100 is attached have recyclable material and also include a magnetic substance. Because of that, when the magnetic substance is put into a crushing machine, the magnetic substance crushed adheres to a crushing and sorting line and causes an obstacle, so that an X mark 103 indicating that it cannot be put into the crushing machine previously is inscribed. As shown in S051 of FIG. 11, there are many components other than the above and the X mark 103 is attached to trouble components where possible, but a mark 100 indicating recycling is inscribed on only substances producing value by performing scrapping disposal and, for example, recycling display is not performed in the case of deciding that scrapping work is difficult and work cost is high, and in view of these, a manual scrapping procedure is examined at a design stage and scrapping time based on this procedure is examined and a decision on a kind of a mark attached and a decision as to whether or not to attach a mark are made. This stage is set to i=0. The work is done while viewing the display device 137 by three-dimensional CAD through information inputted from the input device 139 or the database 133, etc.

Next, calculation of recycling cost is processed by the arithmetic storage device 135 based on drawing data in which structure design is performed by the three-dimensional CAD body 138. First, condition input S052 of design specifications such as raw material information, weight, difficult-to-crush substance information, rare metal content of various mark attachment components examined and obtained at the design stages S050, S051 is done through the communication line 161 or from the input device 136, and (1) valuable and inverse onerous expected unit price every separation material, (2) standard scrapping time every component, (3) unit price per separation work time, (4) product standard scrapping procedure, etc. are read S053 from the database 132 as set conditions previously. Based on these, accumulated transition of the accumulated amount of recovery components with a lapse of manual scrapping time is calculated S054 and calculated results of the valuable amount, the inverse onerous amount, the manual scrapping time and the total cost are displayed on the display device 134 as shown by an example of FIG. 5 etc. A difference between the case that recycling is performed every each component in this calculation and the case that recycling is not performed is obtained and by deciding S055 whether or not the accumulated amount within preset time reaches a target, it is decided whether or not the above recycling disposal is performed. In this case, the accumulated amount and predetermined time which are obtained by experiment etc. and are a target of attainment of profit and loss of recycling business are preset.

If the accumulated amount within the set predetermined time with respect to recovery components reaches the target, work time capable of improving profit and loss by further shortening manual scrapping time is examined S056. However, if the accumulated amount does not reach the target in S055, a flag i is changed S062, S061 and a count, quantity of manually scrapped components are added S058 or a scrapping procedure or time is changed or a structure drawing is changed S060 and also using the input device 139, the calculations are repeated. Also, until the work time is minimized, review in S056 can be done. After the work in recycling design, a drawing is completed S057 and a product is manufactured based on this drawing. Incidentally, the scrapping time changed can be examined to the range in which plural times are preset and variations in a unit price or equipment updating, etc. are accommodated and the best possible profit and loss balance is obtained.

The chart shown in FIG. 5 or FIG. 10 displayed by the display device 134 thus is a diagram in which the axis of abscissa is elapsed time of manual scrapping work and the axis of ordinate is the plus and minus amounts of money produced from recovery components and the amount of money accumulated with time according to a scrapping procedure idea is plotted. As a result of this, it can be decided whether or not a recycling rate recovered as recycling business exceeds a criterion of law etc., and whether or not a cost balance generated in this portion of scrapping disposal is within a target by the amount of difference between manual scrapping work cost and the accumulated amount. This decision can also be made on the display device or decision processing in which comparison is numerically made within the arithmetic storage device 135 may be performed. By using an evaluation device as described in FIG. 12, that is, a process in which a broken line shows upwardness to the right is a process producing value and a downward or sideward process is a process causing loss, so that by examining a manual scrapping procedure of an object product or a count, a kind of components scrapped and recovered while viewing this, a target to put effort into improvement in recycling profit and loss becomes clear visually at a design stage. As a result of this, balance improvement can be obtained simply, that is, from an earlier and higher viewpoint, and product design in which recycling business is successfully achieved from profit and loss and cost invested can be performed.

Incidentally, various data fed back from a recycling business department or design drawings in consideration of recycling examined by a design department are stored in the databases 132, 133 and are read out as necessary. For example, material structure cost every component obtained from the design drawings, a manual scrapping procedure from scrapping experiment etc., necessary time, or instructions by a definition of a manual scrapping object final process in which manual scrapping and mechanical crushing are divided and in a portion manually removed finally, disposal costs before and after this portion are different, etc. are inputted from the design department. On the other hand, a separation yield rate every material at the time of scrapping disposal depending on separation performance of crushing equipment etc. by a machine installed, valuable and inverse onerous expected unit price every separation material, or unit price per time of separation work depending on an equipment operating rate or personnel cost of recycling business, etc. are inputted by the recycling department. These inputs from the recycling department are done every time changes are made in an actual operating state, and the database with higher accuracy can be used. Also as mentioned above, a price etc. of material may acquire information from another department. By these systems, even when there are long-term blanks in which general consumers use a product, or even when there are various kinds of products and also new design is performed every year and new functions or capabilities are added to a structure material of a component year after year, an apparatus or a technique based on a basic principle can be applied to separation performance of scrapping, so that an environmental suitable product can be produced and recovered at low cost in the design department and the recycling field. That is, in favor of trouble components etc. having an influence on environment, a manually scrapped portion and a mechanically crushed portion are utilized for environmental protection, and a range of this manual and mechanical scrapping is divided by a profit and loss balance and in a manual scrapping process, using the chart for making the recovery amount of money higher and scrapping time earlier, design and recovery can be performed and the business is successfully achieved and can be returned to consumers and is utilized for formation of recycling-oriented society and further using communication lines etc., an effective database is built and this database can be maintained to the latest data always, so that it is freed from time obsolescence or constraints.

Next, in this outdoor device 20, a state of the recycling field will be described. A room air conditioner discarded (S001 of FIG. 1) is collected (S002 of FIG. 1) by a collector and the collector carries the room air conditioner into a recycling disposal center (S003 of FIG. 1) and then, before a process of a crushing machine is done, it is checked whether or not an X mark 103 of an environmental impact substance or a difficult-to-crush substance, etc. is displayed, and a marked component is manually scrapped (S004 of FIG. 1). Then, a flow to disposal by the crushing machine from the manual scrapping of this outdoor device will be described. First, the service panel 8 is opened, and chlorofluorocarbon which is an environmental impact substance is recovered. Next, when the top panel 14 and the front cover 2 are opened, manual work items are previously displayed on a back surface and the items for disposal are configured so as to see easily and separation work is done according to kinds of the display (S007 and S008 of FIG. 1). Work for removing the motor 19 and the compressor 5 causing an obstacle to the crushing machine in the case of being put into the crushing machine is done by destroying fixed portions manually. Further, the electric product box 16 including an environmental impact substance is slid and removed. In the case of removing the electric product box 16, a mark 103 indicating that the environmental impact substance is included is inscribed on the outdoor control board 17 and a mark 110 indicating rare metal is used is inscribed on the microcomputer portion. In the outdoor board, only the microcomputer is removed by cutting lead wires and thereafter, proper disposal is performed at cost so as not to have an influence on environment. The recyclable front cover 1 other than the service panel 8, the top panel 14, the front cover 2, the compressor 5, the motor 19 and the microcomputer recovered as valuable substances is manually scrapped and as a result of that, the valuable amount is produced. Via the manual scrapping process described above, the other components are put into the crushing machine used in the final process (S005 of FIG. 1). The outdoor device residual portions after the manual disassembling process are put into the crushing machine one by one as they are. In the outdoor device crushed by the crushing machine, raw materials are sorted by a sorting machine and material can be taken out every raw material and the raw materials are recycled (S006 of FIG. 1). When the outdoor device attempts to be manually scrapped in a shorter time, the top panel 14 is first removed and the front cover 2 is removed. Next, the fan cover 1 is removed and the fan motor 19 is removed. Then, the outdoor control board 17 is removed from the electric product box and thereafter, the compressor 5 could be removed by destroying fixation. Incidentally, after the front cover, the board 17 and the compressor 5 are previously removed and thereafter, the fan cover 1 and the fan motor 19 may be removed.

Figure 15:
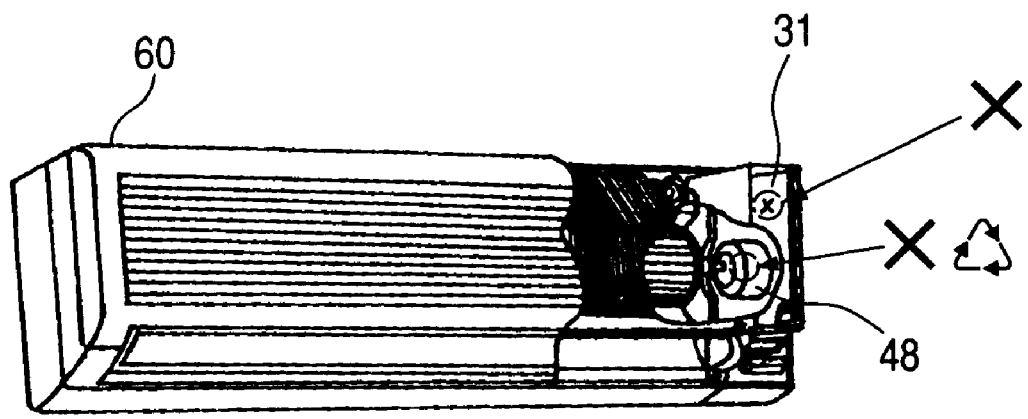
FIG. 15 is a conceptual diagram of a room air conditioner indoor device according to one example of the invention.
Figure 16:
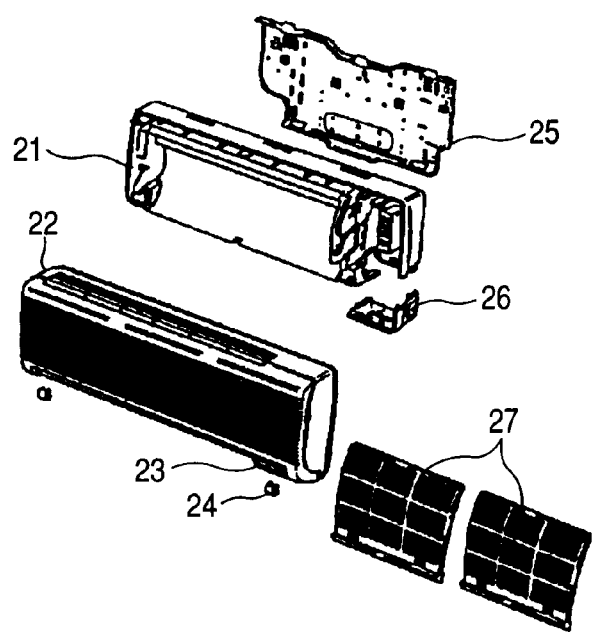
FIG. 16 is a configuration diagram of room air conditioner indoor device components according to one example of the invention.

A diagram showing of a configuration of an indoor device is shown in FIG. 15 and also, names of each component are shown in further detail in FIGS. 16 and 17. An outer enclosure portion of an indoor device 60 is formed by plastics of a box 21, a front panel 22, a decoration cover 23, a screw cap 24, a corner box 26, an air filter 27 and so on. Numeral 25 is a mounting plate made of iron. A recycling code is attached to the above components except the air filter 27. In the case of removing the outer enclosure portion, many inner components can be seen as shown in FIG. 17. In a table of FIG. 17, the components and the names are written and indication as to whether or not the components are valuable substances is written by a mark 100 and difficult-to-crush substances are written by a mark 103. A position and a procedure of a manually scrapped component are displayed on a back surface of this outer enclosure portion removed first. However, information such as this scrapping procedure may be acquired by a record medium or communication separately as described already. As shown in FIG. 17, recycling codes are attached to a nozzle 31, a vane 32, a vane motor 33, a power source cord 34, a motor band 35, an electric product cover 36, a light receiving board holder 37, a board cover 38, a terminal plate cover 42, an electric product box 43, a board box 44, a motor cover 45, a fan motor 48, a heat exchanger 53, unions 54, 56, and copper pipes 55, 57. In the case of the indoor device, as a scrapping procedure in a short time, the front panel 22 is removed and the electric product box 43 is removed or an indoor control board 39 is removed from this box. Subsequently, the nozzle 31 and the fan motor 48 are removed.

A plastic material is used in the box 21, the front panel 22, etc. forming the outer enclosure of the room air conditioner indoor device 60, and the box 21, the front panel 22, etc. are first scrapped manually and are valuable substances and recyclable marks 100 are inscribed. Also, a coating for the purpose of improving appearance is applied to this front panel 22 and a plastic material to which the coating is applied cannot be recycled generally, but a coating material using recyclable thermoplastic resin is used herein and a mark including a material code is inscribed so that recyclability becomes apparent to a disposer. As a substance including an environmental impact substance, a mark indicating the environmental impact substance is included is inscribed on a control board 31 which is a component using lead and a drain hose 29 using vinyl chloride. Further, as a substance which cannot be put into a crushing machine, a mark is inscribed on the fan motor 48 including a magnetic substance and also a nozzle 31 portion is mainly a plastic material and is recyclable, but is formed of plural materials of a foam polystyrene, insulation or a rubber material for the purpose of thermal insulation, and further a sticking plate is stuck and disposal cost to separate only a recyclable substance increases, so that disposal is performed as a trouble substance which cannot be put into the crushing machine. Further, as a substance including rare metal, display is performed to a microcomputer portion on a board 39. By performing the manual scrapping disposal as described above, the display is performed to only the valuable substances and the display is not performed to substances decided that scrapping work is difficult and work cost is high in the scrapping work by the above idea. These decide whether or not to attach a mark and a kind of a mark attached at a design stage. The decision as to whether or not to attach a mark is similar to that of an example in the outdoor device described above, so that description is omitted.

Next, a flow to disposal by a crushing machine from the manual scrapping of the indoor device of the room air conditioner will be described. When the front panel 22 is opened, a mark 100 indicating a recyclable component is inscribed on the front panel 22 and the valuable amount is returned by removing the front panel 22. It is constructed so that the other components are also marked with manual work items such as trouble components or valuable substances and the items for disposal are easy to see. Next, the electric product box 43 including an environmental impact substance is removed. At this time, in a manner similar to the outdoor control board 17 when the electric product box 43 is removed, a mark 103 indicating that the environmental impact substance is included is inscribed and a mark 110 indicating rare metal is used is inscribed on a microcomputer portion. At this time, in the indoor control board 31, only a microcomputer is removed and then disposal is performed at cost as the environmental impact substance. Thereafter, removal work of the motor 48 causing an obstacle to the crushing machine in the case of being put into the crushing machine is done. Via the manual scrapping disposal described above, it is put into the crushing machine used in the final process (S005 of FIG. 1). The indoor device residual portions after the manual disassembling process are put into the crushing machine one by one as they are. In the indoor device crushed by the crushing machine, raw materials are sorted by a sorting machine and material can be taken out every raw material and the raw materials are recycled (S006 of FIG. 1).

As described above, the recyclable component, the component which cannot be put into the crushing machine, and the components including the environmental impact substance, the rare substance, etc. are explicitly shown previously and the contents in the manual work process are clear and efficiency of recycling disposal can be improved. Also, as shown in FIGS. 14 and 17, the recycling marks 100 could be attached to many components in the range capable of manual scrapping. However, actual scrapping for scrapping complicated products or many components is desirably performed according to a scrapping procedure specified. The scrapping procedure is displayed to a product or is stored in a storage element etc. mounted in the product, or information etc. obtained by communication in the recycling field can be displayed on a display device 143. In this case, preference is given to description of the scrapping procedure and components described in the procedure are manually removed preferentially except the case of being changed later. However, in a product in which a scrapping place is clear and a procedure is not important, for example, a small electric appliance or an air conditioner outdoor device with few components removed manually, etc., work for removing marked components may be done within manual scrapping time set. In this case, the time is the highest priority and when the time exceeds a predetermined time, even components marked except a trouble mark are not removed. By adopting such a recovery method, division between manual and mechanical work is obeyed by the manual scrapping time and profit and loss are secured. However, in case that recovery equipment by mechanical crushing is insufficient or cannot be used due to failure etc., constraint of the manual scrapping time is removed and the marked components are recovered as many as possible and thereby the accumulated amount of money can be increased.

Figure 18:
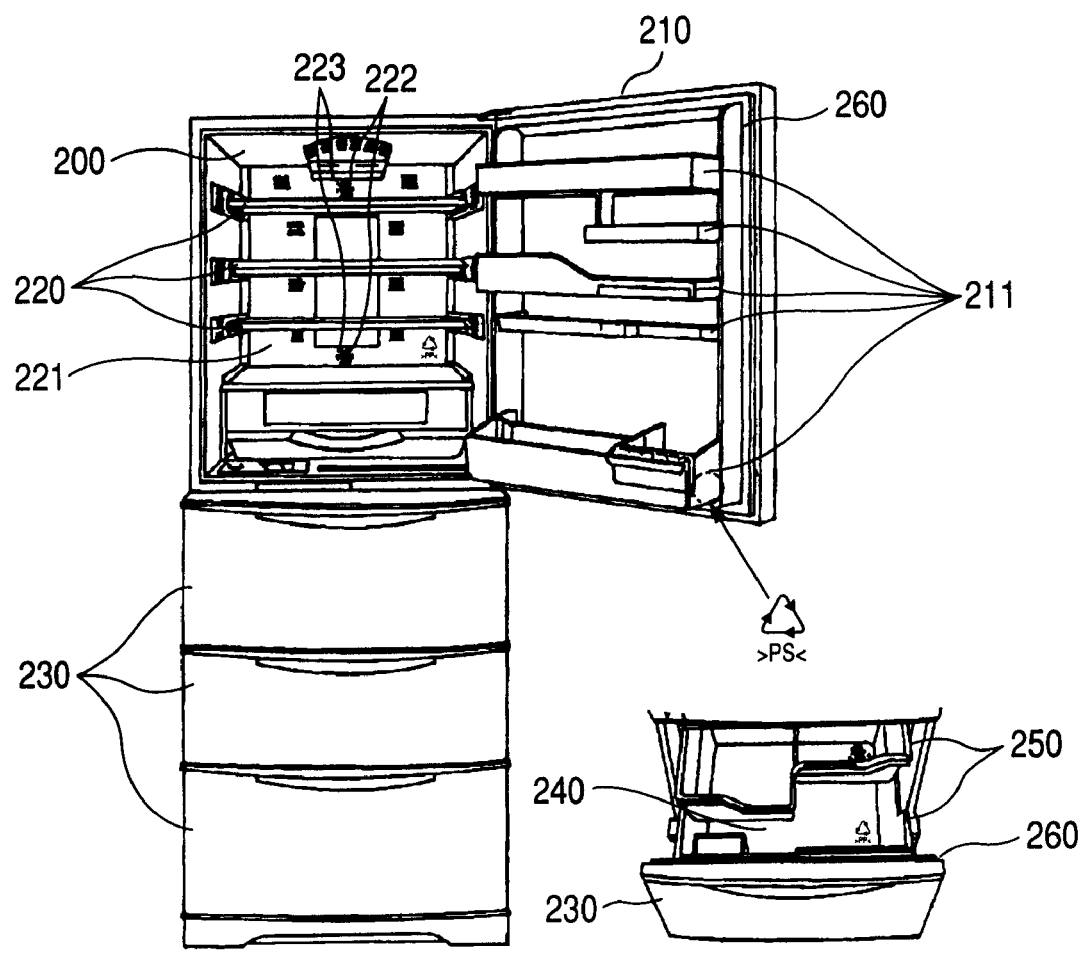
FIG. 18 is a front view of a refrigerator component configuration according to one example of the invention.

Next, recycling disposal of a refrigerator will be described in FIGS. 18 and 19. FIG. 18 shows a configuration of a refrigerator of a four-door type viewed from the front. An upper refrigerator room 200 has a rotary door 210 and door pockets 211 made of plastic are installed therein. Also, within the refrigerator, plastic shelves 220 for partitioning the inside of this refrigerator are fixed and in the back, a cold air passage component 221 for cold air distribution is fixed by screws 222. Also, three rooms of the lower portion are stockrooms 240 having pullout doors 230. Within the stockroom 240, a food receiving case 250 is installed on a frame (not shown) fixed in the pullout door and the case 250 is moved with opening and closing of the door. In order to keep intimate contact with a body at the time of closing the door, door packing 260 is installed on the periphery of each door.

Figure 19:
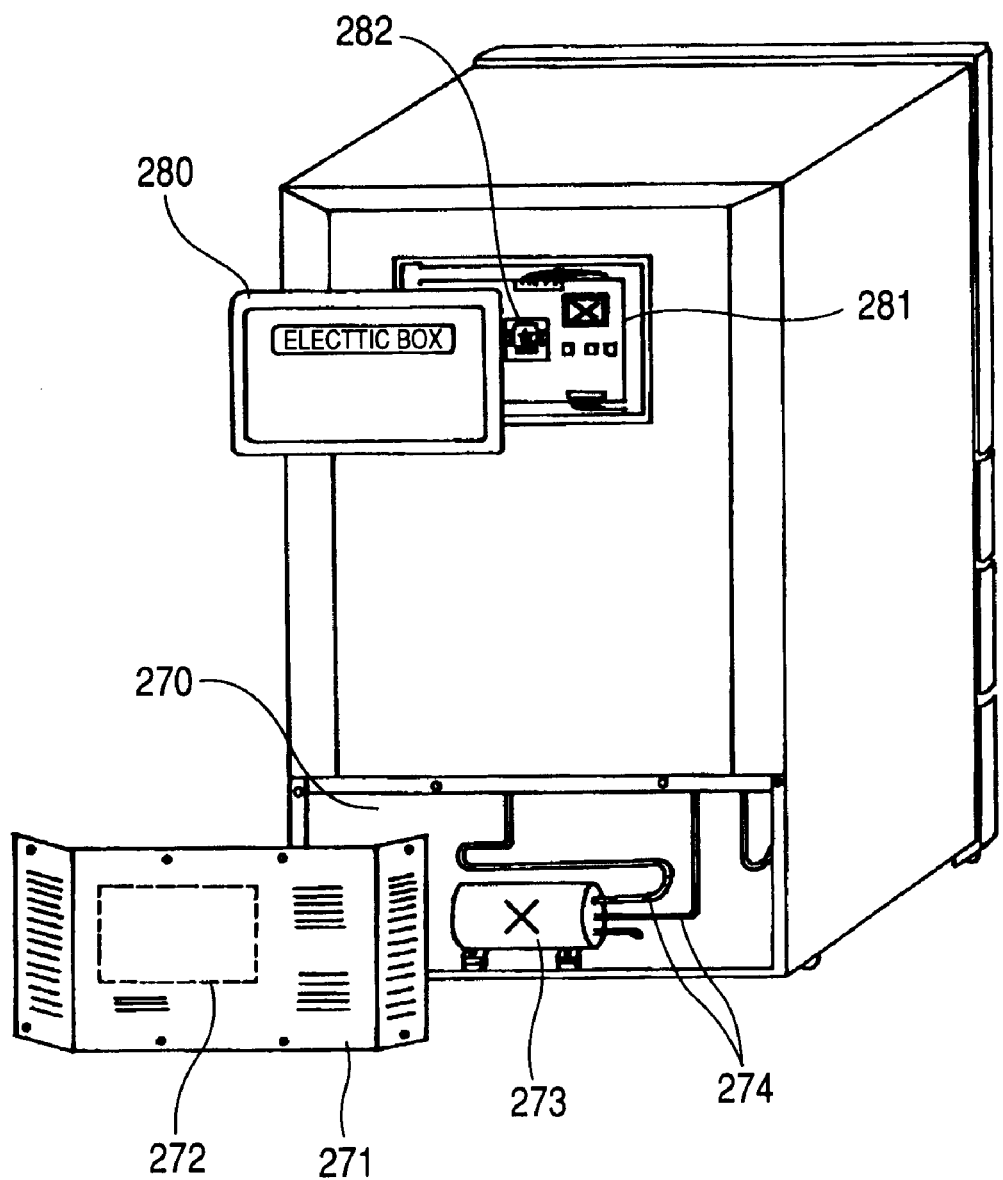
FIG. 19 is a rear view of a refrigerator component configuration according to one example of the invention.

FIG. 19 shows the refrigerator viewed from the back. In a lower machine room 270, there are a transverse compressor 273 forming a refrigerating cycle, and refrigerant piping 274 in which a heat exchanger etc. placed among this compressor, an outer box of the refrigerator and each the room are connected and a refrigerant for cooling each of the rooms of the refrigerator flows. There is an electronic control board 281 in an upper electric product box 280, and a microcomputer 282 of the center performs centralized control. In the refrigerator of the configuration described above, there are the inside plastic shelves 220, the door pockets 211, the food stock case 250 within the pullout door, the cold air passage component 221 without adhesion of seal material, etc. as recyclable components. These components manually scrapped are respectively formed of the same kind of material and even in case of attaching another kind of component, it is constructed so that the same plastic material is used and there is no need for the separation. For example, transparent and cheap PS (polystyrene) is used in the inside plastic shelves 220 and the door pockets 211, and the food stock case 250 within the pullout door or the cold air passage component 221, etc. are unified into PP (polypropylene) with light weight and high impact, and they are integrated as recyclable general-purpose plastics. For separation at the time of manual scrapping, marks 100 indicating recyclable components and material codes are together attached to these components.

Also, as a substance including an environmental impact substance in the refrigerator, there is the electronic control board 281 and this includes lead, so that an X mark 103 indicating that the environmental impact substance is used is inscribed. Further, a magnetic substance is included in the compressor 273 and the door packing 260 on the door periphery, so that an X mark 103 indicating that a substance which cannot be put into a crushing machine is included is inscribed. Also, the electronic board 281 is equipped with the microcomputer 282 and a ☆ mark 100 is inscribed on this component. In a large-scale product such as the refrigerator, effort to merely carry the large-scale product or change a turn is taken and the large-scale product is heavy, so that manpower is avoided and the large-scale product is often carried by a machine such as a crane. A procedure for scrapping a refrigerator which is such a large-scale electric appliance in a short time will be described. First, a machine room cover 271 of the back is first scrapped manually and chlorofluorocarbon is removed and then the compressor 273 is removed. For removal, the machine such as a crane can be used effectively. Next, a component present in the back, for example, the board 281 could be scrapped manually. After the back side, the front side, for example, a door is opened and the inside shelves 220 are manually removed and then the door pockets are removed and the case 250 within the pullout door is removed. Then, a door gasket 260 is removed. However, in the case that the procedure is changed and more components are manually scrapped in a shorter time, after the back side is scrapped, the gasket 260 is first removed and plastics are removed from the shelves using the remaining time.

A flow to disposal by a crushing machine from manual scrapping of the refrigerator will be described. First, the machine room cover 271 of the lower back is removed. When the machine room cover is opened, a manual work item list or FIG. 272 is previously displayed on a back surface of this cover and it is constructed so that items for disposal are easy to see. Chlorofluorocarbon which is an environmental impact substance is first recovered there. In a manner similar to the air conditioner, disposal of the chlorofluorocarbon is performed by a special disposer after the recovery, so that it results in inverse onerousness. That is, the chlorofluorocarbon recovery has work cost and the inverse onerous amount is added after the recovery. Further, the compressor 273 causing an obstacle to the crushing machine in the case of being put into the crushing machine is removed. Then, the electronic control board 281 including an environmental impact substance is removed from the electric product box 280 present in the upper portion of the machine room. Since there is the microcomputer 282 to which a mark indicating rare metal is used is attached on the board, only this microcomputer is removed and the remainder is disposed of at cost so as not to have a bad influence on environment.

The inside of the refrigerator of the front side is manually scrapped. When the rotary door 210 of the upper refrigerator room is opened, the pockets 211 in which recyclable marks are inscribed on the sides are present in a door portion and all of these pockets can be lifted upward and removed. All the same removal methods are vary useful in efficiency of work at the time of manual scrapping. Marks indicating recyclable components are also inscribed on the plastic shelves 220 inside the door and all of these shelves can be pulled out forward and removed. This removal method is shown in FIG. 20. As shown in FIG. 20, the door pocket 211 is manually lifted upward and removed. Also, the inside plastic shelf 220 is lifted upward and removed. The food stock case 250 is lifted upward and removed after the pullout door 230 is pulled out. In manually scrapped components, materials are unified into, for example, PS every component, respectively, so that the same material is separated together and is carried in a plastic special recycling factory as the same general-purpose plastics and is recycled as recycled plastics and thereby is disposed of as value.

Next, a mark indicating a recyclable component is also inscribed on the cold air passage component 221 present in the back of the refrigerator room. This component is generally fastened by the screws 222 and in consideration of the time of scrapping, it is simply configured so that notches 223 are provided in the circumferences of the screw portions and removal can be performed by only pulling off the screws 222 without removing the screws at the time of manual scrapping. Also, in such a cold air passage component 221, generally, there are often cases that seal materials are stuck for prevention of cold air leakage, but when plastics are recycled, these seal materials result in mixture of foreign matter and cause a large obstacle to recycling, so that in a recyclable mark, attachment of the mark 100 needs to be limited to components without sticking of such seal materials. The flow proceeds to the pullout door 230. When the pullout doors 230 are opened, there are the food stock cases 250, respectively. Since recyclable marks are also inscribed on these, all are lifted upward and removed. Also, in these components, materials are unified into PP, so that the same material is separated together and is recycled as recycled plastics and is disposed of as value in a manner similar to PS. After manual scrapping of the components inside the refrigerator, the door packing 260 provided on the periphery of the door is removed. In order to keep intimate contact at the time of closing the door, a plastic type magnet is built into this door packing 260 and the magnet is a difficult-to-crush substance and also the door packing itself is vinyl chloride regarded as an environmental impact substance, so that removal is required. Via the manual scrapping disposal described above, it is put into the crushing machine used in the final process (S005 of FIG. 1). The refrigerator residual portions after the manual disassembling process are put into the crushing machine one by one as they are. In the refrigerator crushed by the crushing machine, raw materials are sorted by a sorting machine and material can be taken out every raw material and the raw materials are recycled (S006 of FIG. 1).

Figure 21A:
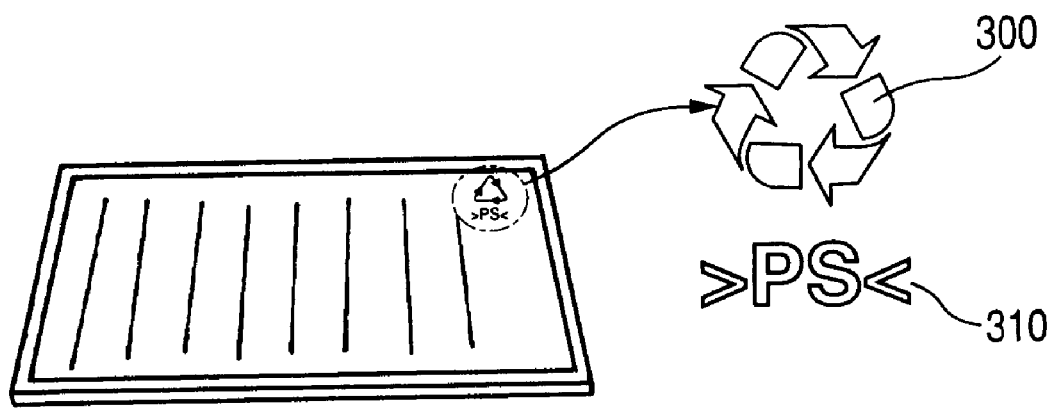
FIGS. 21(a) and 21(b) are recyclable mark display explanatory diagrams according to one example of the invention.
Figure 21B:
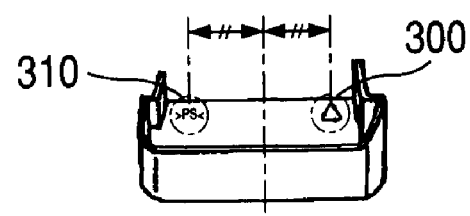
Figure 22A:
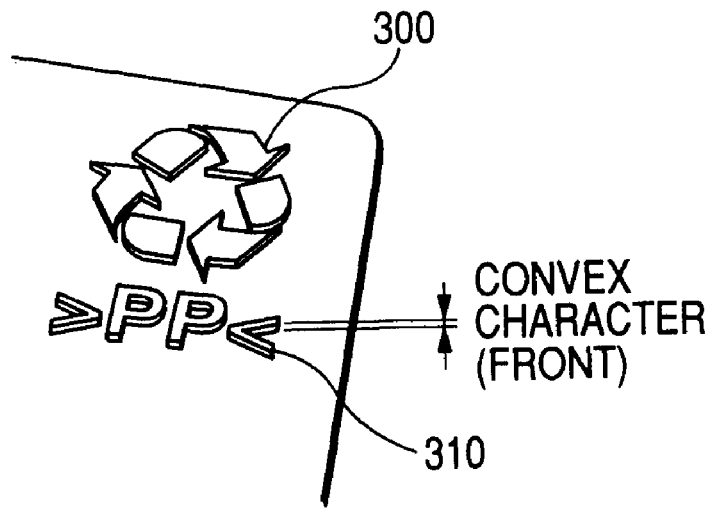
FIGS. 22(a) and 22(b) are recyclable mark display explanatory diagrams according to one example of the invention.
Figure 22B:
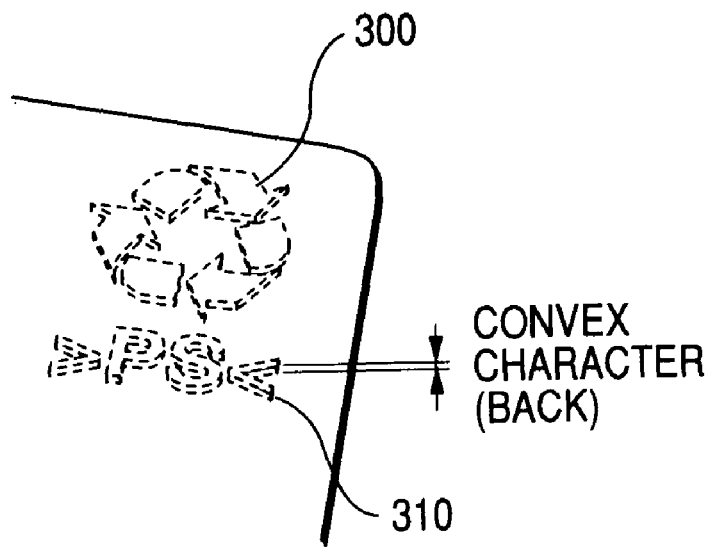
Figure 23A:
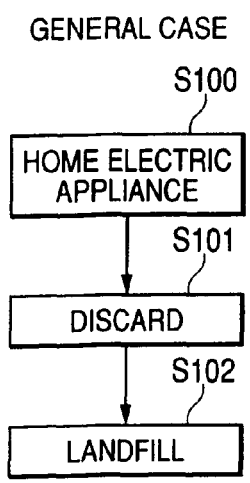
FIGS. 23(a) and 23(b) are flowcharts of a conventional recycling method.
Figure 23B:
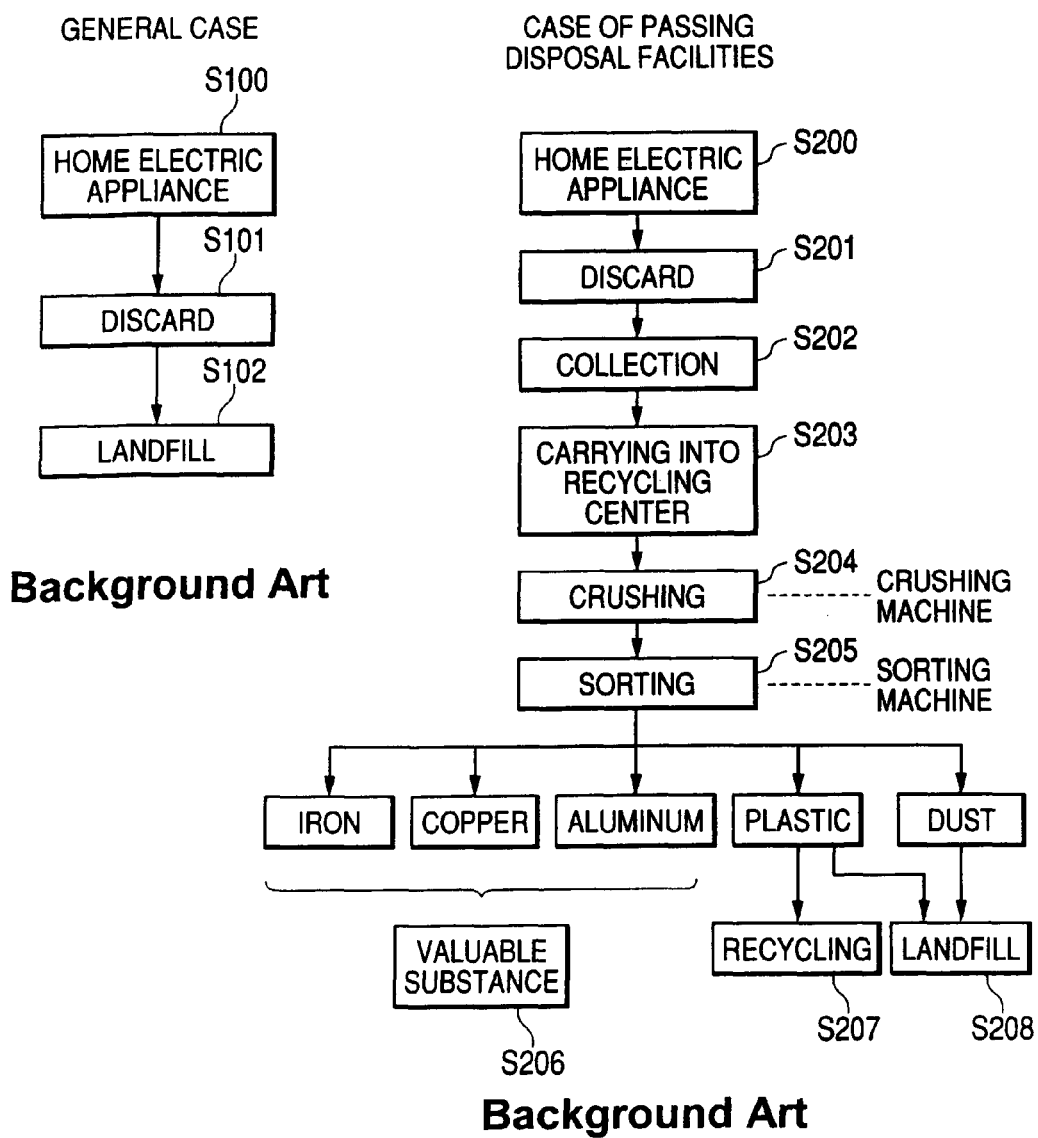

As shown in FIG. 21(*a*), a recyclable mark 300 and a material code 310 are together described to the plastic recyclable component as mentioned above and in this case, it is best desirable to describe the material code 310 in the vicinity of the recyclable mark 300 for recognition. However, when there is a space problem or a pattern is not good, as shown in FIG. 17*b*, a method for describing the material code 310 in a position axisymmetrical to the recyclable mark 300 may also be used since recognition is maintained. Also, when description of the mark and the code to the plastic component is previously engraved on a metal mold for molding of the plastic component, transfer to the component can be performed at the time of molding of the component. This is very economical since extra cost other than cost for engraving on the metal mold is not required. Also, as shown in FIGS. 22(*a*) and 22(*b*), it is more desirable to describe these mark 300 and code 310 by a convex character since there is an advantage that a worker is aware of the description by making contact with a finger at the time of manual scrapping in addition to recognition by a visual check. For an opaque component, this convex character is constructed so as to be a correct character on the front side of the component as shown in FIG. 22(*a*). Also, for a transparent component, it is more desirable to construct the convex character so as to be a correct character on the back side of the component when viewed from the front as shown in FIG. 18*b* since wear or dirt due to food is not caused. By the description of the recyclable mark and the material code in combination as mentioned above, the manual scrapping disposal becomes clear and separation by material can be recognized at a glance and efficiency of the manual scrapping disposal improves considerably.

In an example of the air conditioner or the refrigerator, a Mobius loop in conformance with ISO14021 is used as the recyclable mark 100, but a mark defined independently may be used. Also, as a product to which a mark is attached, it can be applied to all-round home electric appliances such as a washing machine, a television, a cleaner, a microwave oven, a video or a small device as well as the air conditioner and the refrigerator. When a size of the mark is too small, it is difficult to recognize the mark, so that one side of the mark is desirably 7 mm or more. In an example of the air conditioner or the refrigerator, the X mark is used as a mark indicating a component which may cause trouble in the case of being put into the crushing machine, but other marks may be used as shown in FIG. 3. Also, as a product to which a mark is attached, it can be applied to all-round home electric appliances such as a washing machine, a television as well as the air conditioner and the refrigerator, and in addition to the components described in the example, a deflecting yoke or a cathode-ray tube of a television, a large-scale electrolytic capacitor, etc. are this display object.

In an example of the air conditioner or the refrigerator, the X mark is used as a mark indicating a component made of raw material having an influence on environment, but other marks may be used as shown in FIG. 3. Also, as a product to which a mark is attached, it can be applied to all-round home electric appliances such as a washing machine, a television as well as the air conditioner and the refrigerator, and in addition to the control board including lead described in the example, a balancer of a washing machine using salt water, a battery or the like including mercury or lead, etc., a flame-resistant plastic molded component including a specific bromine group flame retardant like a switch box, etc. are this display object. In an example of the air conditioner or the refrigerator, the ★ mark is used as a mark indicating that rare metal is included, but other marks may be used as shown in FIG. 3(*j*). Also, as a product to which a mark is attached, it can be applied to all-round home electric appliances such as a washing machine, a television as well as the air conditioner and the refrigerator, and a thermoelectric element etc. are this display object. In the case of manually scrapping an electric appliance, it is important that a cover or an outer enclosure to which a difficult-to-crush substance or an environmental impact substance is attached is first removed and an influence is not had on recycling, and it is constructed so that these trouble substances are easy to remove on product design, so that disposal can be performed in a shorter time. Thereafter, since it is constructed so that valuable substances such as components containing rare metal are easy to remove, when these components are disposed of and subsequently plastics or the like are manually scrapped in consideration of scrapping time, recovery producing money can be made. Metal or the like can be simply recovered even by mechanical crushing, so that a profit and loss balance is minimized in disposal by machine.

As described above, in the case of recovering and recycling an electric appliance, a mark is attached to a previously removed component and the component is distinguished from another component and thereby at the time of manual disassembling work before being put into a crushing machine, a removal place and a kind of the component become clear and disposal cost can be decreased and a component returning the valuable amount can be collected at the minimum disposal cost. In the previously removed component, accumulated transition of value of the removed component is shown with respect to a lapse of time taken for removal and is compared with time work cost of a previous removal process and thereby an object component is previously selected at a design stage, so that extra removal work is not done and improvement in disposal cost can be made. The previously removed component includes a component which may cause trouble in the case of being put into the crushing machine and a mark is attached to its component, so that a removal place becomes clear and trouble with the crushing machine can be prevented. The previously removed component includes a component made of raw material having an influence on environment and a mark is attached to its component, so that a removal place becomes clear and omission of disposal of an environmental impact substance is prevented and improvement in environment can be made.

In the previously removed component, a mark is attached to a component having rare metal, so that a removal place becomes clear and the valuable amount can be returned by collecting the rare metal. All of the plastic molded components in which material recycling is performed can be removed by the same method, so that workability at the time of scrapping improves. A raw material of the plastic molded component in which the material recycling is performed is any of polypropylene, polystyrene, high impact type modified polystyrene and acrylonitrile-butadiene-styrene copolymer, and general material is used, so that material separation and recyclability improve. A mark representing recyclability and a material code are together attached to the plastic molded component in which the material recycling is performed, and thereby purity at the time of separating recycled substances improves. The material code is displayed in the vicinity of the recyclable mark or in a position axisymmetrical to the recyclable mark, so that separation work efficiency of recycled substances improves. The mark representing recyclability and the material code are described by a convex character with respect to a component, so that separation work efficiency of recycled substances improves. The convex character of the mark representing recyclability and the material code is desirably described in a direction capable of reading as a correct character on the front side of a component for an opaque component and reading as a correct character on the back side of a component when viewed from the front for a transparent component. An object component list of the previously removed component or an instruction diagram of a disassembling procedure is displayed or recorded in a predetermined place of a product or a predetermined specific component, so that scrapping work efficiency improves.

As described above, a recovery method of an electric appliance of this invention comprises the steps of displaying a mark or a symbol to a manually scrapped component capable of being disassembled by a tool or manually without disassembling or crushing by machine at the time of discard or recovery after use, scrapping the manually scrapped component from a product by a tool or manually before disassembling or crushing by machine at the time of discard or recovery after use, and crushing the residual product by machine after scrapping the manually scrapped component, and display of the mark or the symbol is a mark or a symbol capable of separation into plural kinds of substance on which a cost burden is imposed and valuable substance after recovery, so that scrapping can be performed easily at low cost.

Also, in a recovery method of an electric appliance, in a mark or a symbol capable of separation into plural kinds, a mark or a symbol is attached to at least any of a trouble component damaging a crushing machine, a trouble component including a substance causing an obstacle to a run of a machine and a trouble component including a substance having a bad influence on environment, and also another mark or symbol is attached to any of a component including a substance having recovery value and a valuable recycled component, so that recycling business can be done effectively.

Also, in a recovery method of an electric appliance, scrapping of a manually scrapped component to which a mark or a symbol is displayed is scrapping of a component to specified scrapping order or a component within specified time, so that useless work can be eliminated to do efficient recycling business.

Also, in a recovery method of an electric appliance, a position of a manually scrapped component or specified scrapping order or scrapping time in the case of scrapping the manually scrapped component to which a mark or a symbol is displayed are preset and also setting of this set position or order or time can be changed by communication means or input means, so that flexible recycling business can be done while viewing a profit and loss balance.

Also, a recovery method of an electric appliance comprises the steps of presetting and displaying plural kinds of manually scrapped components capable of being disassembled by a tool or manually without disassembling or crushing by machine at the time of discard or recovery after use, scrapping the manually scrapped components from a product by a tool or manually before disassembling or crushing by machine at the time of discard or recovery after use, and performing crushing by machine after scrapping the manually scrapped components, and the display is performed on a display device provided in an electric appliance by reading from storage means or receiving information from the outside through communication means, so that easy and simple work can be done.

Also, a recovery method of an electric appliance comprises the steps of displaying a manually scrapped component capable of being disassembled by a tool or manually without disassembling or crushing by machine at the time of discard or recovery after use on a preset display device, scrapping the manually scrapped component from a product by a tool or manually before disassembling or crushing by machine at the time of discard or recovery after use, and performing crushing by machine after scrapping the manually scrapped component, and setting of display of the display device can be changed by communication means or input means, so that easy scrapping work capable of being adapted to any recycling field can be done.

Also, a recovery method of an electric appliance comprises the steps of setting time for scrapping a manually scrapped component capable of being disassembled by a tool or manually without disassembling or crushing by machine at the time of discard or recovery after use, providing notification of arrival at scrapping time preset before scrapping during scrapping of the manually scrapped component, and performing crushing by machine after scrapping the manually scrapped component, and setting of the scrapping time set can be changed by communication means or input means, so that recovery at low cost can be made independently of a time difference between a point in time of design and a point in time of discard of the electric appliance.

Also, a scrapping evaluation method of this invention comprises the steps of presetting scrapping time of plural kinds of manually scrapped components capable of being disassembled by a tool or manually inside a structure of a product, presetting the value amounts of the plural kinds of the manually scrapped components, obtaining accumulation of the value amounts of the plural manually scrapped components with a scrapping time lapse of scrapping the product in order, and performing display or notification so as to set and change a kind or a position or a count or a scrapping procedure of a manually scrapped component so that the accumulation of the value amounts every scrapping time lapse reaches a predetermined value amount in an early time before the preset scrapping time or the accumulation of the value amounts every scrapping time lapse results in accumulation or more of a target value amount in a predetermined scrapping time, so that a product can be separated at low cost.

Also, a scrapping evaluation method comprises the steps of presetting scrapping time of plural kinds of manually scrapped components capable of being disassembled by a tool or manually inside a structure of a product, presetting the value amounts of the plural kinds of the manually scrapped components, obtaining accumulation of the value amounts of the plural manually scrapped components with a scrapping time lapse of the product, and accumulating the value amounts every scrapping time lapse to decide whether or not this scrapping time and value amounts are smaller than the value amount to the preset scrapping time or are later than scrapping time to the preset value amount, so that recycling business with a clear profit and loss balance can be done.

Also, a scrapping evaluation method comprises a step capable of setting and changing a kind or a position or a count or a scrapping procedure of a manually scrapped component when scrapping time and the value amount are smaller than the value amount to scrapping time preset or are later than scrapping time to the value amount preset, so that a profit and loss balance can be improved.

Also, a scrapping evaluation method comprises a step of displaying scrapping time and the value amount after change while setting and change can be made by input means or communication means, so that flexible scrapping evaluation can be made.

Also, a scrapping evaluation method comprises a step of providing notification of a change in a product structure so as to change a kind or a position or a count or a scrapping procedure of a manually scrapped component when the value amount to scrapping time is smaller than the value amount to scrapping time preset or is later than scrapping time to the value amount preset, so that profit and loss can be improved surely.

Also, a scrapping evaluation method comprises the steps of presetting scrapping time of plural kinds of manually scrapped components capable of being disassembled by a tool or manually inside a structure of a product, presetting the value amounts of the plural kinds of the manually scrapped components, obtaining accumulation of the value amounts of the plural manually scrapped components with a scrapping time lapse of the product, and accumulating the value amounts every scrapping time lapse to display the value amounts to this accumulated scrapping time and cost necessary for the scrapping time preset, so that an easy scrapping evaluation method can be obtained.

Also, a scrapping evaluation method comprises a step of providing notification of a change in a product structure so as to change a kind or a position or a count or a scrapping procedure of a manually scrapped component in the case of deciding that the value amount to scrapping time is smaller than cost to scrapping time preset, so that profit and loss can be improved surely.

Also, in an electric appliance of this invention, in the case of recovering a product after use, according to disposal of recovery, plural kinds of marks are attached to a component removed previously by a tool or manually before crushing by machine or are stored by different symbols in storage means provided in the product and the component is distinguished from other components, so that an easy-to-separate product can be obtained.

Also, in a previously removed component of an electric appliance, accumulated transition of value of the removed component is obtained with respect to a lapse of time taken for removal and is compared with time work cost of a previous removal process and thereby an object component is determined, so that a product capable of being separated at low cost can be obtained.

Also, a previously removed component of an electric appliance includes a trouble component which may cause trouble in the case of being put into a crushing machine, or a trouble component made of raw material having an influence on environment, or a valuable component with value of presence of rare metal etc., or a plastic component and also, a mark or a symbol indicating trouble is attached to the trouble component and a mark or a symbol indicating value is attached to the valuable component, so that a product with clear profit and loss of recycling can be obtained.

Also, a plastic component among previously removed components of an electric appliance can be removed by the same method, for example, the same removal direction, so that a product capable of being separated in a short time can be obtained.

Also, a raw material of a plastic component among previously removed components of an electric appliance is any of polypropylene, polystyrene, high impact type modified polystyrene and acrylonitrile-butadiene-styrene copolymer, and a mark or a symbol representing recyclability and a material code are together described to a plastic component of an electric appliance of the present invention, so that the plastic can be separated in a short time.

Also, in an electric appliance, a material code is described in the vicinity of a mark representing recyclability or in a position axisymmetrical to the mark, so that separation can be performed quickly.

Also, a mark representing recyclability of an electric appliance and a material code are described by a convex or concave character with respect to a component and this convex or concave character is described in a direction capable of reading as a correct character on the front side of a component for an opaque component and reading as a correct character on the front side of a component or a correct character on the back side of a component when viewed from the front for a transparent component, so that even a product after discard can be read speedily.

Also, in an electric appliance, an object component list of a previously removed component and an instruction diagram of this manual disassembling procedure are displayed or stored in a predetermined place of a product or a predetermined specific component, so that an easy-to-scrap product can be obtained. Also, in the case of opening a cover or the like covering a surface of an electric appliance of the present invention, a difficult-to-crush substance and an environmental impact substance or components to which the difficult-to-crush substance and the environmental impact substance are mounted are exposed, so that manual scrapping in a short time can be performed.

Also, an information system of an electric appliance of this invention comprises design input means which can input structure design of the electric appliance and also can preset plural kinds of manually scrapped components capable of being disassembled by a tool or manually, the components being partial components of this structure, storage means for previously storing raw material unit prices of the plural manually scrapped components and scrapping time every component, and display means for displaying accumulation of value amounts of manually disassembled components with a manual scrapping time lapse of the electric appliance from component information about plural components which can be manually disassembled and are inputted from the design input means and information stored in the storage means, and the design input means, the storage means and the display means are connected through communication means, so that a system in which necessary work can be done anywhere and a product is easy to recycle can be obtained.

Also, in an information system of an electric appliance, in the case of discarding an electric appliance, a range of a manually scrapped component can be changed and also information stored can be updated, so that an easy-to-use system independent of a point in time of design and a point in time of discard can be obtained.

Also, a recovery apparatus of an electric appliance of this invention comprises set value input means for presetting scrapping time of plural kinds of manually scrapped components capable of being disassembled by a tool or manually inside a structure of an electric appliance and also presetting value amounts of the plural kinds of the manually scrapped components, calculation means for obtaining accumulation of value amounts of the plural manually scrapped components with a scrapping time lapse of the appliance, and display means for displaying or recording to provide notification that scrapping cannot be performed within the preset scrapping time by accumulation of the value amounts every the scrapping time lapse, so that an apparatus capable of making profit and loss of recycling business clear can be obtained.

Also, a recovery apparatus of an electric appliance comprises setting means for presetting scrapping time for manually scrapping plural kinds of manually scrapped components capable of being disassembled by a tool or manually without disassembling or crushing by machine at the time of discarding an electric appliance or recovering the electric appliance after use, display means capable of displaying kinds, positions, counts or scrapping procedures of the manually scrapped components by reading from the setting means or reading from storage means provided in the electric appliance or receiving information from the outside through communication means, and timer means for measuring work time for scrapping the plural kinds of manually scrapped components displayed by the display means and also providing notification of time of the preset scrapping time, so that scrapping can be performed at low cost.

Also, a recovery apparatus of an electric appliance comprises time value record means for recording value amounts of manually scrapped components of plural kinds preset as the accumulated amount with a scrapping time lapse, so that an apparatus with a clear profit and loss balance can be obtained.

Also, a recovery apparatus of an electric appliance comprises scrapping time record means for recording scrapping time of manually scrapped components of plural kinds preset, so that a recovery apparatus effective at any point in time can be obtained.

Also, in a recovery apparatus of an electric appliance, setting means or display means or time value record means or scrapping time record means can make setting or display or recording remotely through a communication system, so that profit and loss can be grasped in the case of scrapping anywhere.

Also, a scrapping evaluation apparatus of this invention comprises set value input means for presetting scrapping time of plural kinds of manually scrapped components capable of being disassembled by a tool or manually inside a structure of a product and also presetting the value amounts of the plural kinds of the manually scrapped components, calculation means for obtaining accumulation of the value amounts of the plural manually scrapped components with a scrapping time lapse of the product, and display means for accumulating the value amounts every scrapping time lapse and displaying a relation between the value amounts to this scrapping time and cost to the scrapping time preset, so that profit and loss evaluation of recycling is simplified.

Also, a scrapping evaluation apparatus comprises design input means for changing a drawing of a product so as to set and change a kind or a count or a scrapping procedure of a manually scrapped component when cost to scrapping time is higher than the value amount, so that discard cost can be reduced at a point in time of design.

INDUSTRIAL APPLICABILITY

As described above, the present invention contributes or is applied to scrapping work or separation work at the time of discard of electric appliances such as used home electric appliances.

The invention claimed is:

1. A recovery method of an electric appliance, comprising:
checking a display of a mark or a symbol on a manually scrapped component capable of being disassembled by a tool or manually without disassembling or crushing by machine at the time of discard or recovery after use;
starting a manual scrapping time;
scrapping the manually scrapped component from a product by a tool or manually before disassembling or crushing by machine at a time of discard or recovery after use;
obtaining an accumulated amount of value of the manually scrapped component from scrapping the product;
comparing, at a computer, the manual scrapping time and the accumulated amount of value with respective target values; and
crushing a residual product by machine after the scrapping.

2. The method of claim 1, wherein the starting includes starting the manual scrapping time when the product is set in a predetermined position.

3. The method of claim 1, further comprising:
in response to determining that the accumulated amount of value or the manual scrapping time are outside their respective target values, obtaining a scrapping procedure from a database, and conducting a simulation of the scrapping procedure.

4. The method of claim 1, wherein the obtaining includes displaying the accumulated amount of value from scrapping the product on a display device, and the starting includes displaying the manual scrapping time on the display device.

5. The method of claim 1, further comprising:
receiving, at the computer, data about prices of raw materials, wherein the accumulated value is based on the prices of raw materials.

* * * * *